(12) United States Patent
Robinson

(10) Patent No.: US 7,364,389 B2
(45) Date of Patent: Apr. 29, 2008

(54) DEBURRING TOOL

(76) Inventor: James R. Robinson, 660 E. Allen, Howell, MI (US) 48855

( * ) Notice: Subject to any disclaimer, the term of this patent is extended or adjusted under 35 U.S.C. 154(b) by 242 days.

(21) Appl. No.: 11/352,670

(22) Filed: Feb. 13, 2006

(65) Prior Publication Data

US 2006/0127192 A1 Jun. 15, 2006

Related U.S. Application Data

(63) Continuation-in-part of application No. 10/717,353, filed on Nov. 19, 2003, now Pat. No. 6,997,655.

(51) Int. Cl.
B23B 51/00 (2006.01)

(52) U.S. Cl. ............... 408/156; 408/180; 408/181; 408/714

(58) Field of Classification Search ........ 408/153–156, 408/159, 185, 180–181, 187, 714; 82/1.2, 82/1.5
See application file for complete search history.

(56) References Cited

U.S. PATENT DOCUMENTS

| | | | |
|---|---|---|---|
| 1,008,363 A | 11/1911 | Pica | 408/154 |
| 2,495,583 A | 1/1950 | Heron | 82/1.5 |
| 2,571,395 A | 10/1951 | Vawter | 77/73.5 |
| 2,620,689 A | 12/1952 | Cogsdill | 82/1.5 |
| 2,657,597 A | 11/1953 | Pickering et al. | 77/73.5 |
| 2,663,203 A | 12/1953 | Fried et al. | 408/154 |
| 2,716,360 A | 8/1955 | Cogsdill et al. | 82/1.2 |
| 2,739,497 A | 3/1956 | Fried et al. | 408/156 |
| 2,745,299 A | 5/1956 | Fried et al. | 82/1.2 |
| 2,855,812 A | 10/1958 | Fried | 408/159 |
| 2,895,356 A | 7/1959 | Cogsdill | 77/73.5 |
| 2,940,367 A | 6/1960 | Cogsdill | 408/79 |
| 3,017,791 A | 1/1962 | Fried | 77/73.5 |
| 3,166,958 A | 1/1965 | Cogsdill | 77/73.5 |
| 3,172,309 A | 3/1965 | Cogsdill | 77/73.5 |
| 3,306,136 A | 2/1967 | Gustkey | 77/58 |
| 4,086,018 A | 4/1978 | Robinson et al. | 408/226 |
| 4,147,463 A | 4/1979 | Robinson | 408/156 |
| 4,320,998 A | 3/1982 | Kubicek | 408/226 |
| 4,333,727 A | 6/1982 | Bennett | 408/191 |
| 5,277,528 A | 1/1994 | Robinson | 408/201 |
| 5,358,363 A | 10/1994 | Robinson | 408/153 |
| 5,501,554 A | 3/1996 | Robinson et al. | 408/153 |
| 5,755,538 A | 5/1998 | Heule | 408/154 |
| 5,803,679 A | 9/1998 | Heule | 408/211 |
| 6,533,505 B1 | 3/2003 | Robinson | 408/1 R |
| 6,997,655 B2* | 2/2006 | Robinson | 408/156 |
| 7,172,373 B2* | 2/2007 | Heule | 408/156 |

* cited by examiner

*Primary Examiner*—Daniel W. Howell
(74) *Attorney, Agent, or Firm*—Bliss McGlynn, P.C.

(57) ABSTRACT

A deburring tool includes a blade having a cutting head portion, an anchor portion, and a retention spring. An arbor is adapted to removably mount the blade such that the head portion of the blade is adapted to be elevated a predetermined distance from the arbor in an unstressed condition of the blade. The blade is sufficiently resiliently yieldable such that the head portion of the blade can move inwardly relative to the arbor during deburring operations. A holder is adapted to mount the arbor and an adjustment member adapted to operatively engage the anchor portion of the blade. The anchor portion of the blade is adapted to move in response to adjustment of the adjustment member in a direction substantially opposite that of the head portion and flex to elevate the head portion relative to the arbor for deburring operations or recess the head portion relative to the arbor.

25 Claims, 13 Drawing Sheets

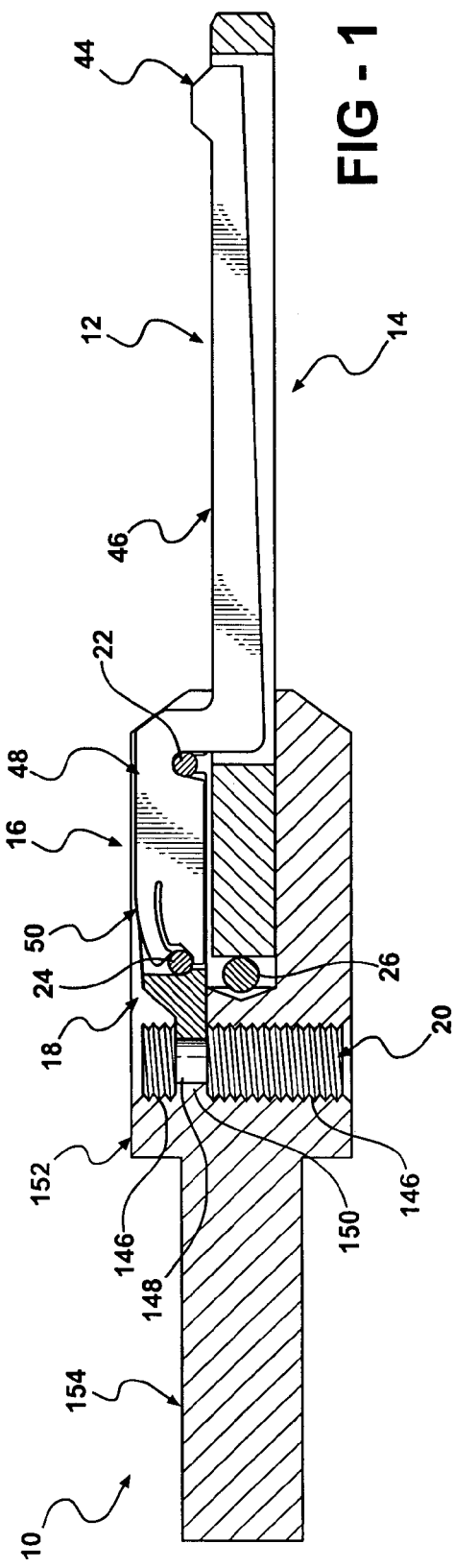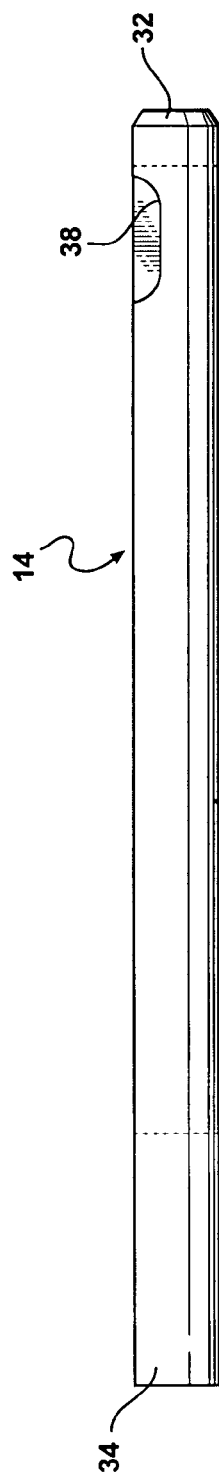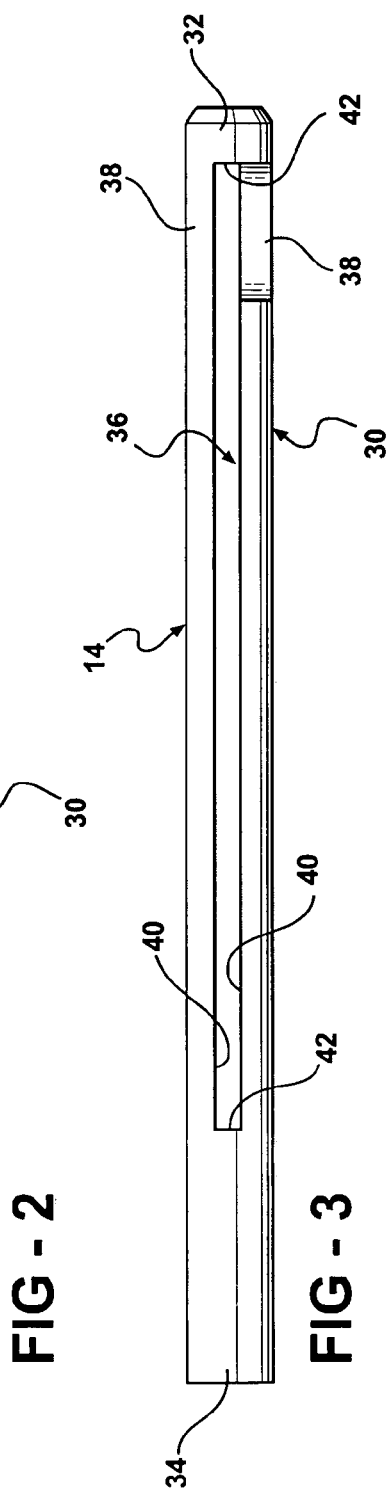

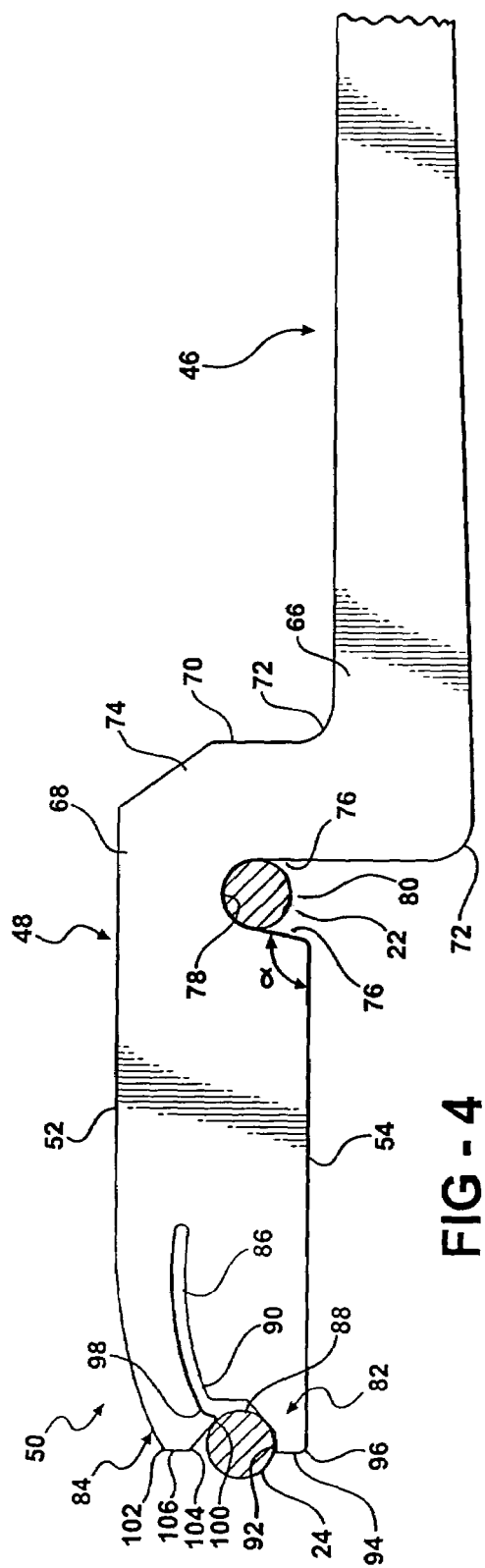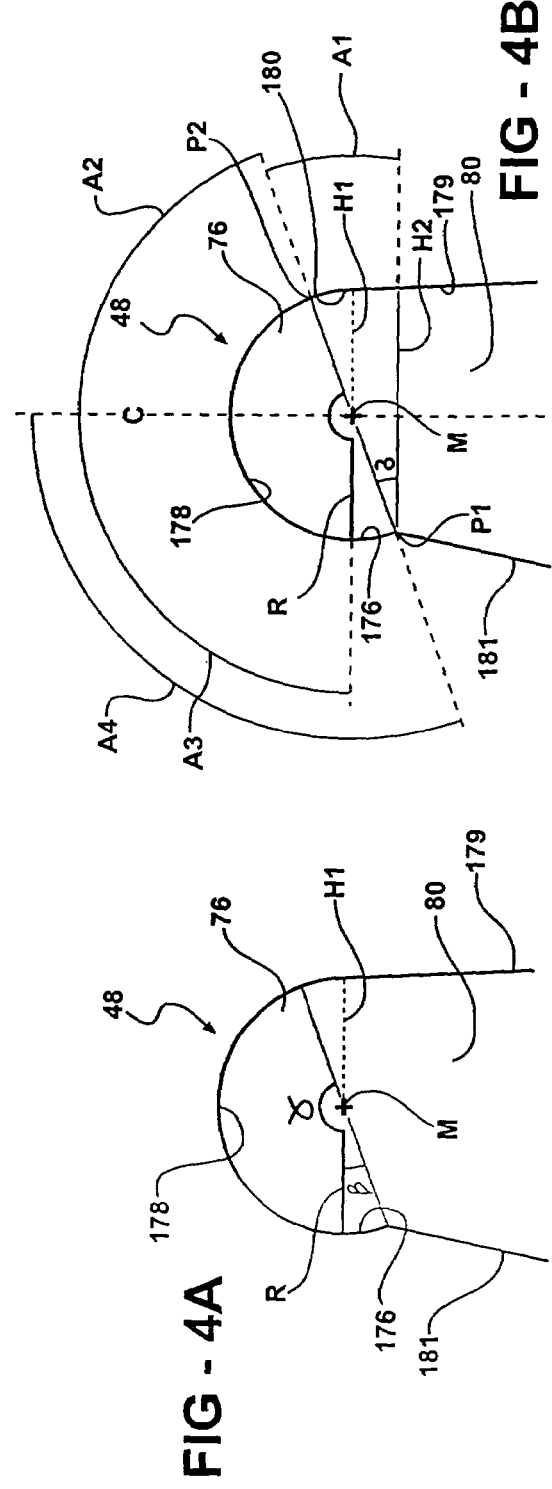

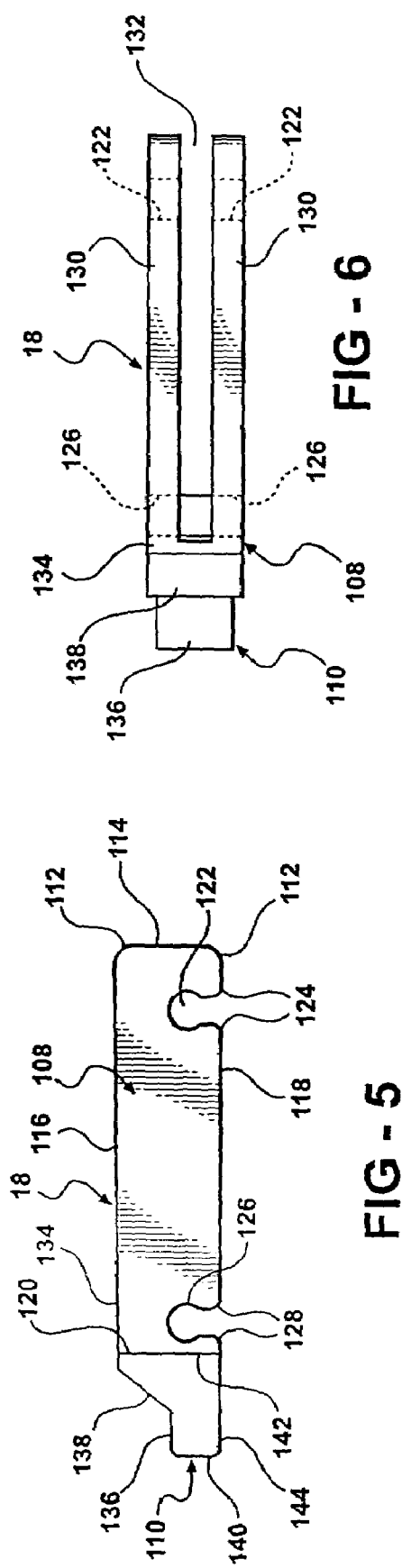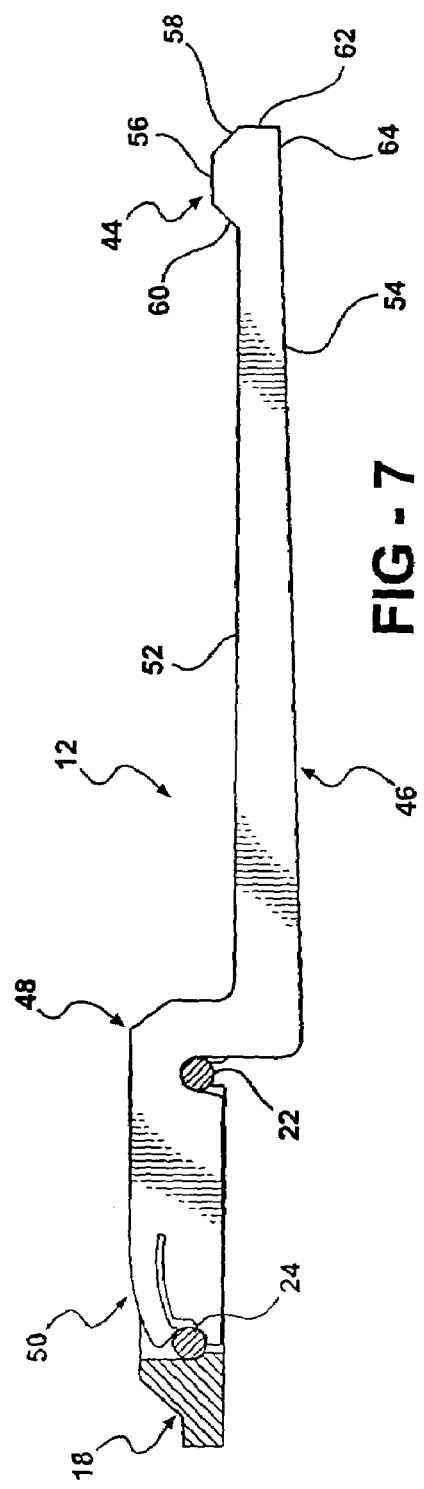

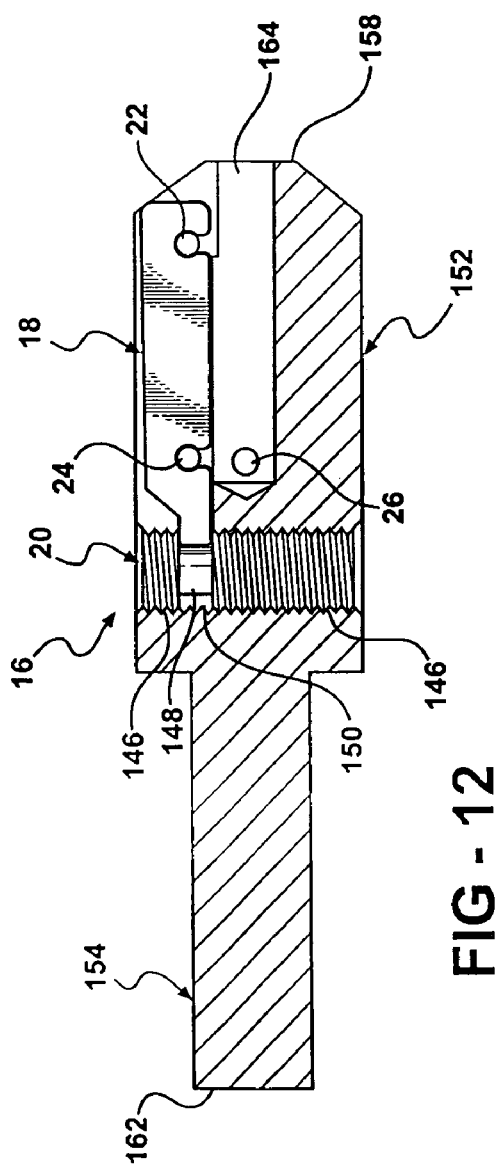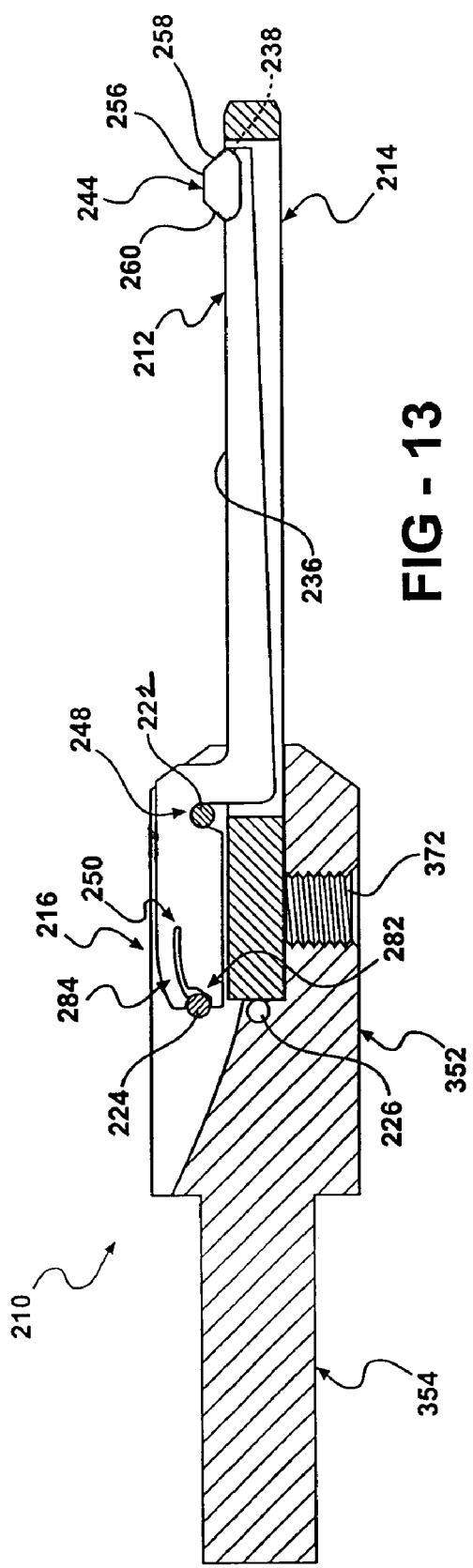

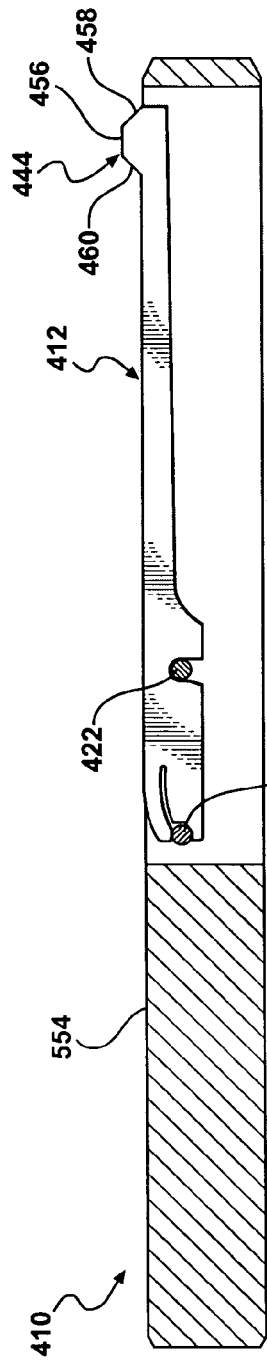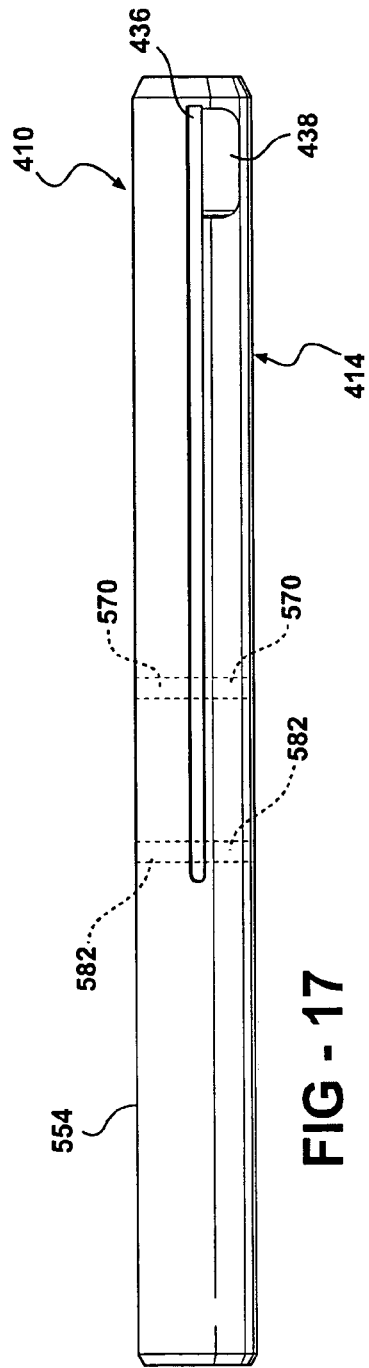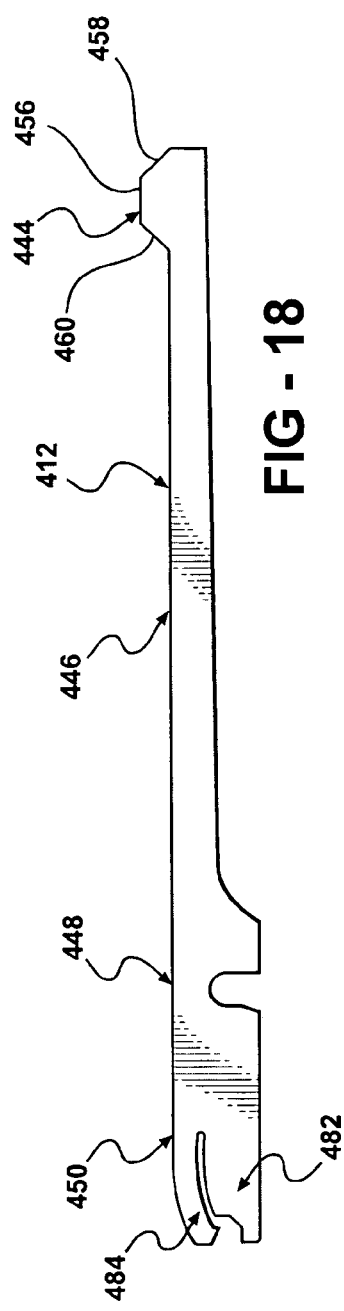

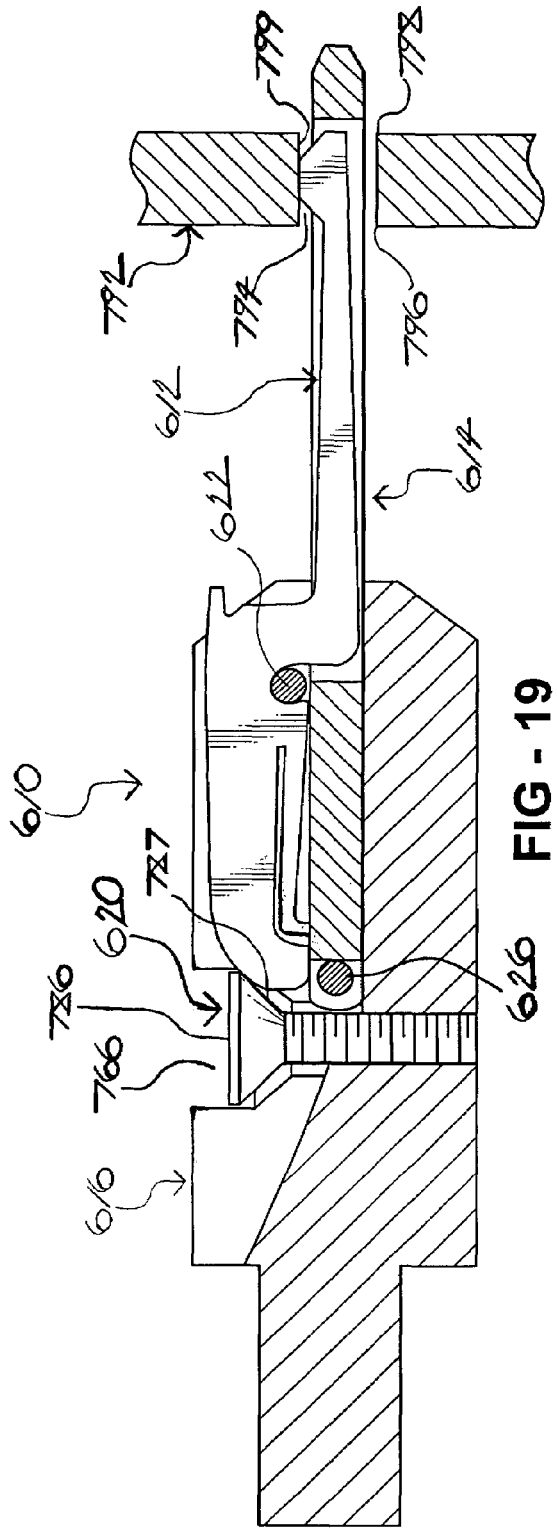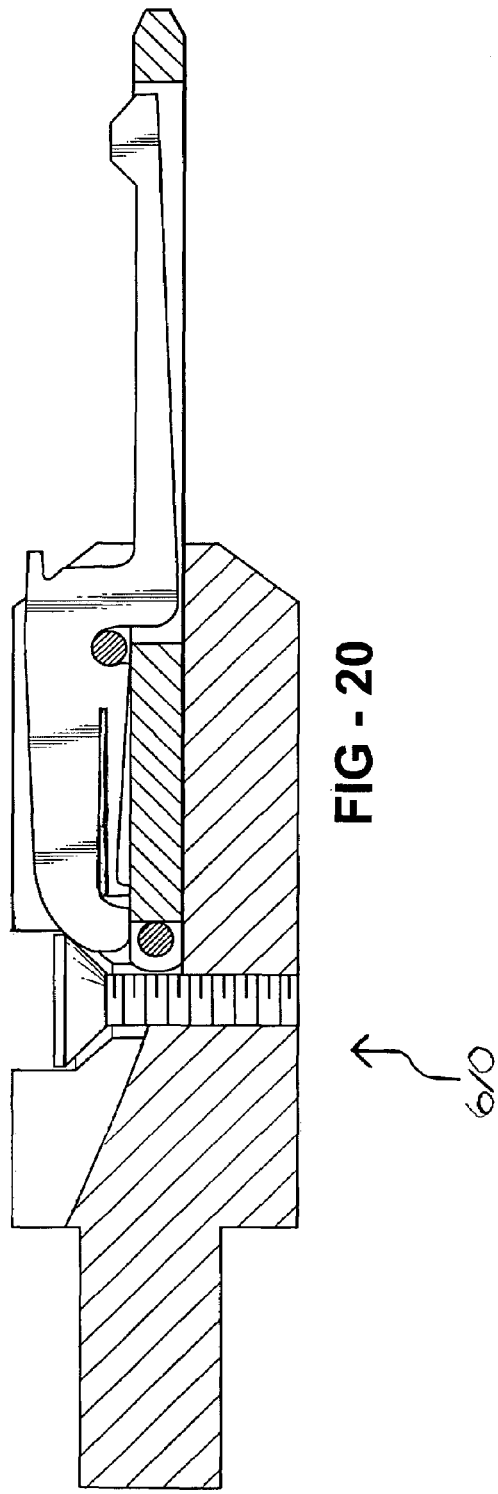

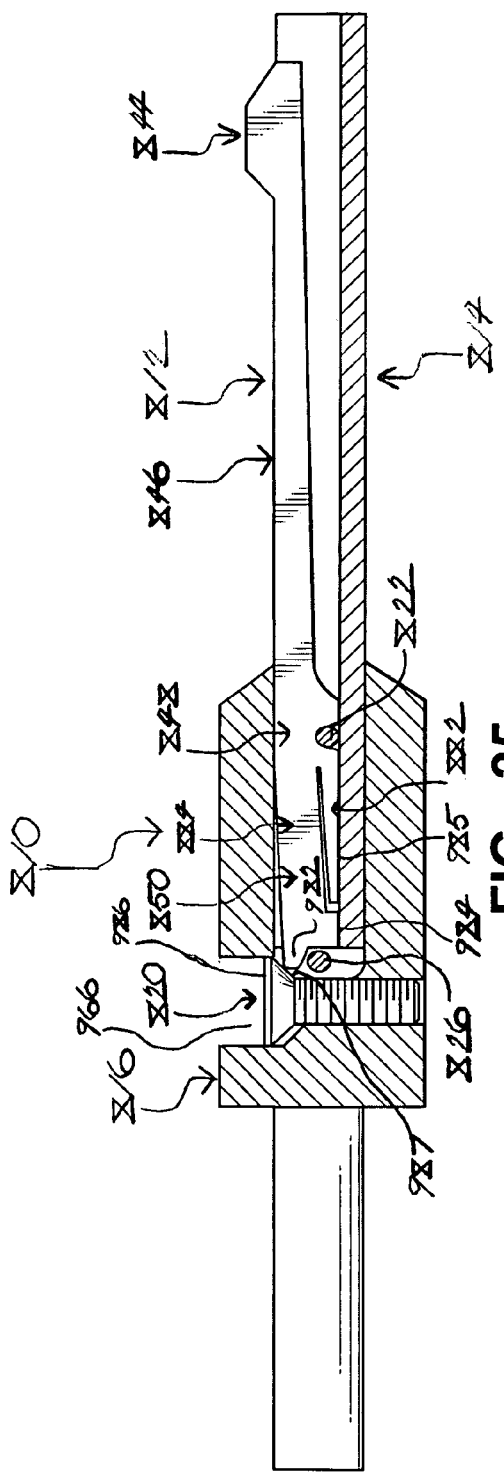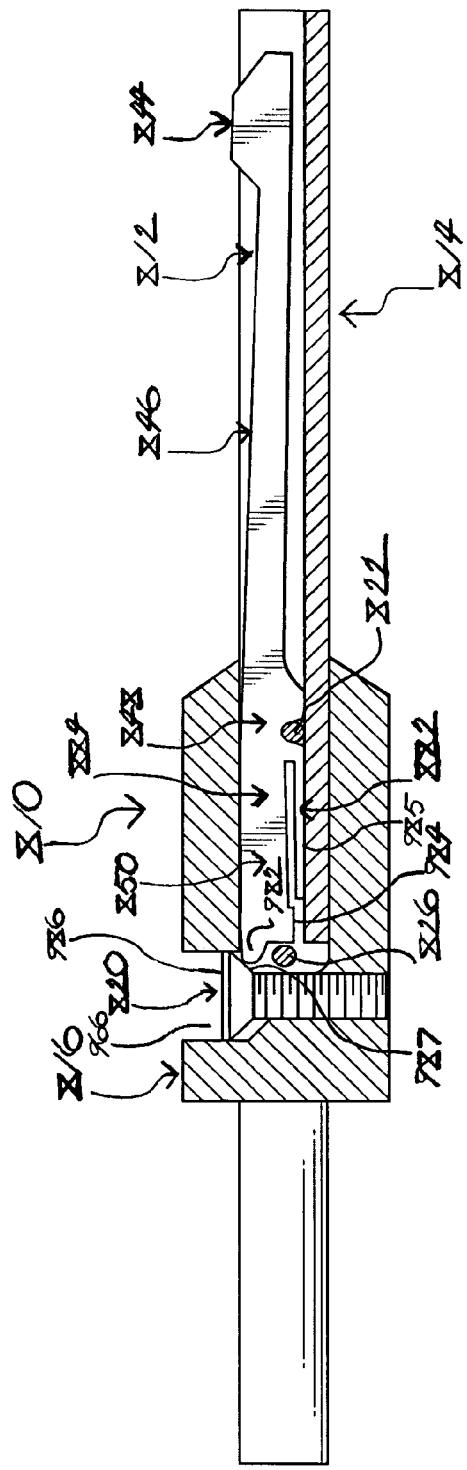

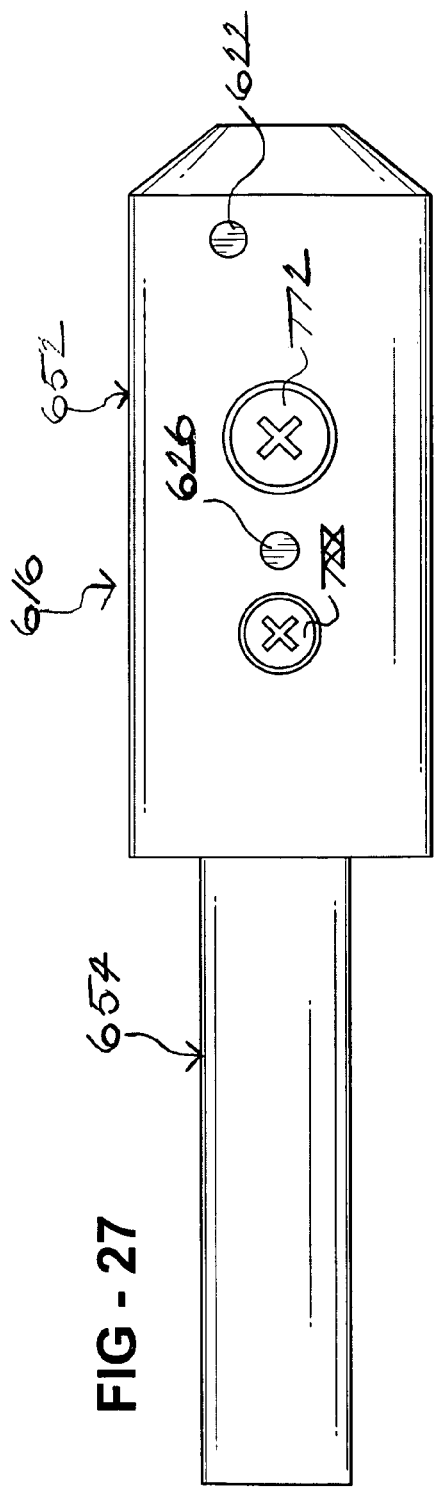
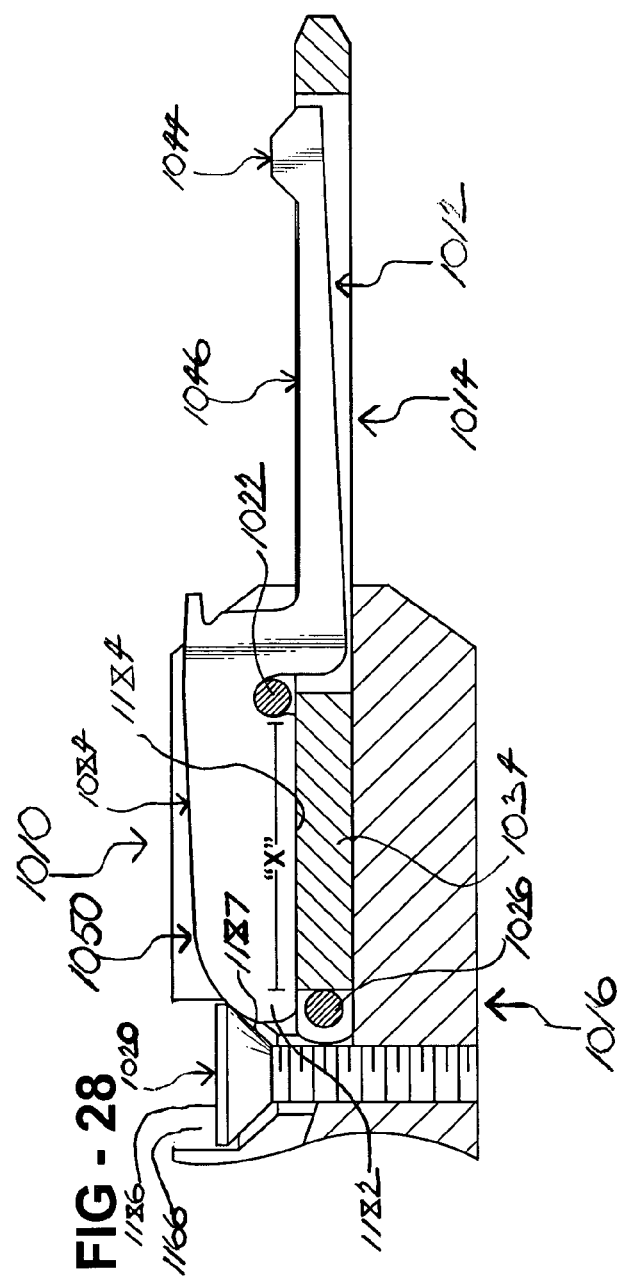
FIG - 27
FIG - 28

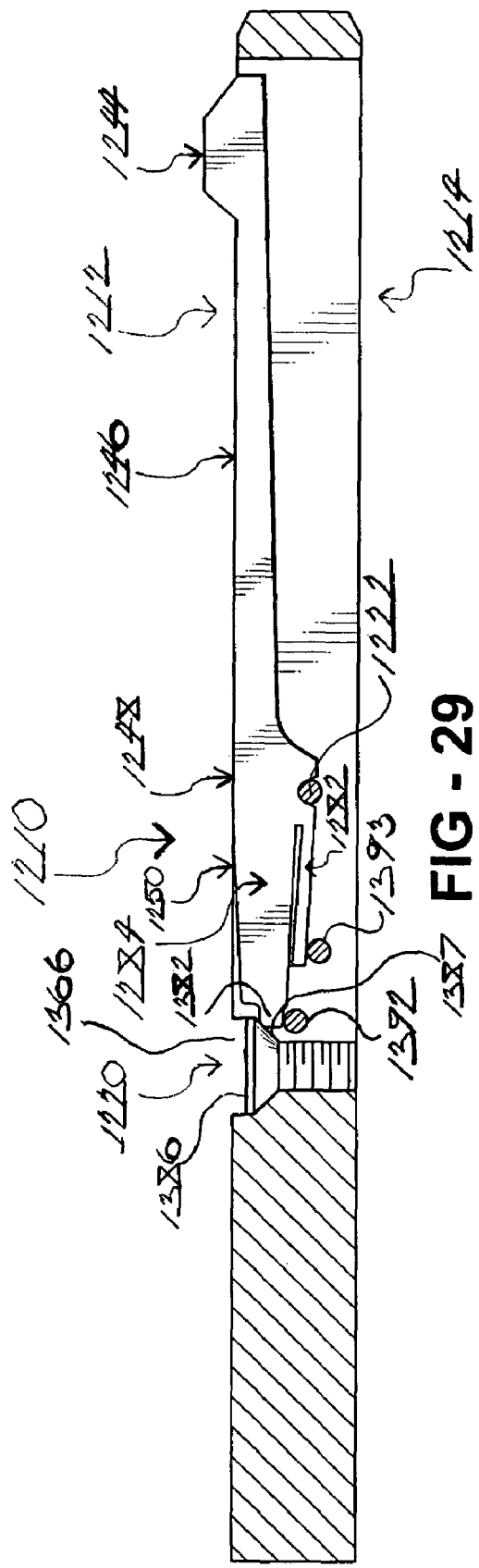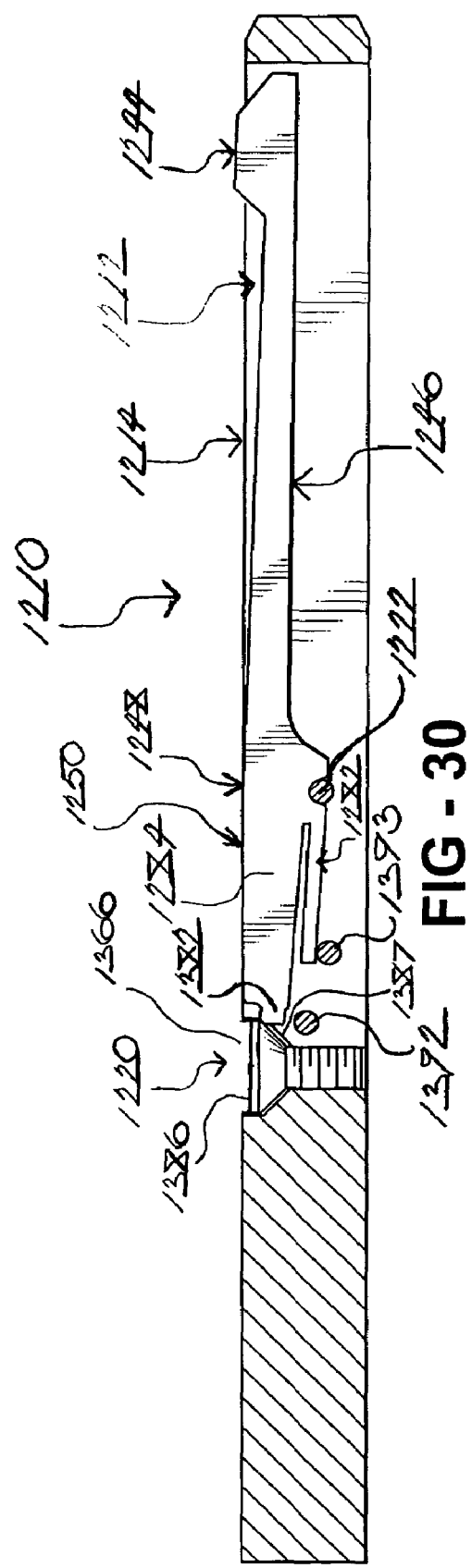

DEBURRING TOOL

CROSS-REFERENCE TO A RELATED APPLICATION

This is a continuation-in-part application of and claims benefit to U.S. patent application Ser. No. 10/717,353 filed Nov. 19, 2003 now U.S. Pat. No. 6,997,655 and entitled "Deburring Tool."

BACKGROUND OF THE INVENTION

1. Field of the Invention

The present invention relates, in general, to deburring tools and, in particular, to a deburring tool having a replaceable blade.

2. Description of the Related Art

A deburring tool is generally employed to remove burrs left on an edge defined by a passage cut or drilled through a work-piece, such as a valve body or the like, made of metal or other material and to cut a chamfer on the edge. Deburring tools known in the related art are respectively disclosed in U.S. Pat. No. 4,086,018 issued to Robinson et al. on Apr. 25, 1978 for a pin-type deburring tool having a replaceable cutting head; U.S. Pat. No. 4,147,463 issued to Robinson on Apr. 3, 1979 for an adjustable-position deburring tool having a replaceable and adjustable-position cutting head; U.S. Pat. No. 5,358,363 issued to Robinson on Oct. 25, 1994 for a lockable deburring tool having a replaceable and adjustable-position cutting head; and U.S. Pat. No. 5,501,554 issued to Robinson et al. on Mar. 26, 1996 for another lockable deburring tool having a replaceable and adjustable-position cutting head.

One type of a deburring tool generally includes an elongated cylindrical body, or arbor (or pilot), formed with a recess for receiving a blade. The recess extends a fixed distance into the arbor and typically has two closed ends. The recess defines a pair of opposed, flat surfaces disposed in spaced, parallel relationship with respect to one another. A unitary blade is received in the recess and includes a cutting head with an integral, elongated, flat, resilient blade extending therefrom. The blade is removably mounted in the arbor such that a point is defined about which the blade can pivot.

More specifically, it is well known in the related art to mount the blade in the arbor by a pair of pins spaced from each other relative the longitudinal axis of the blade and extend transversely of the blade through the recess and a pair of correspondingly spaced openings defined in the blade. One of the pins may be a roll pin that extends through one of the openings to define the pivot point. The other pin extends through the other opening defined at the end of the blade opposite the cutting head and holds this end in non-pivotal relationship with the arbor with the cutting head projecting from the recess for engaging a work-piece. The portion of the blade extending from the roll pin toward the cutting head is resiliently yieldable to permit the cutting head to move inwardly with respect to the recess during a deburring operation. Each of the arbor and blade may be removed and replaced by removing the pins. A deburring tool of this type is known in the related art as a pin-type or fixed-position deburring tool having a fixed-position cutting head.

It is also well known in the related art to mount the blade in the arbor by securing the end of the blade defined opposite the cutting head to the arbor in such a manner that not only is a portion of the blade yieldable to permit the cutting head to move inwardly with respect to the recess, as with the fixed-position cutting head, but also the cutting head is biased to an operable position extending from the recess. More particularly, the blade can be selectively pivotally adjusted with respect to the arbor to, in turn, adjust the unstressed position of the cutting head with respect to the recess. In this case, a pin is mounted in and extends transversely of the arbor through the recess and the blade, and an adjustable screw is threadedly mounted in and extends transversely of the arbor at a location spaced from the pin with the longitudinal axis of the screw extending perpendicularly to the longitudinal axis of the pin. The blade is connected with the screw in such a manner that rotation of the screw in the arbor pivotally adjusts the blade to adjust the unstressed position of the cutting head with respect to the recess. In other words, adjustment of the screw adjusts the pivot of the blade about the pin, thereby adjusting the position of the cutting head relative to the recess prior to any deburring activity. Each of the arbor and blade may be removed and replaced by removing the pin and screw. A deburring tool of this type is known in the related art as an adjustable-position deburring tool having an adjustable-position cutting head.

It is also well known in the related art to mount the blade in the arbor and then to receive and mount the arbor in an assembly holder. In this case, the arbor includes a head portion disposed at one end of the arbor, and the recess extends from the head portion to the end of the arbor defined opposite the head portion. Furthermore, the blade is mounted between the pair of opposed, flat surfaces defined by the recess and the arbor. The assembly holder has a central passage extending longitudinally through the assembly holder and adapted to receive the arbor. The central passage holds in position the pair of opposed, flat surfaces to frictionally clamp the blade between the pair of opposed, flat surfaces. The assembly holder also has an aperture extending transversely of the central passage and adapted to receive a screw to fixedly mount the arbor and blade within the assembly holder. In this way, the blade can be mounted in the recess and held in place by the assembly holder. The assembly holder and, thus, arbor and blade may be removed and replaced by removing the screw. This type of deburring tool is not adjustably positionable, may be used to deburr a passage having a relatively small diameter, and, in this case, has been referred to as a micro deburring tool.

It is also well known in the related art to mount the blade in the arbor by another method using an adjustable screw and a pivot member. In this method, the screw is threadedly mounted in and transversely of the arbor for fixedly engaging a terminal portion of the blade. The pivot member extends through and transversely of the recess and blade to define the pivot point about which the blade can pivot and includes a non-threaded, hemispherical portion having at least one flat face. The blade defines an open-arced, partially circumferential slot that, with the blade, defines a flat at one end of the partial circumference. The hemispherical portion is received in the slot and adapted to rotate therewithin until the flat face of the hemispherical portion comes into abutting engagement with the flat presented by the blade and slot to lock the blade within the arbor while permitting the blade to pivot about the pivot member. When it is time to change the blade, the flat face is rotated out of engagement with the flat by rotation of the pivot member, the screw and pivot member are removed, and the blade is lifted from the arbor. The pivot member may be rotated by using an Allen wrench, a regular screwdriver, a Phillips-head screwdriver, or any other type of conventional tool while the arbor remains mounted in a machine used to drive the deburring tool. This type of deburring tool is known in the related art as a lockable deburring tool and one also with an adjustable-position cutting head.

The blades, in general, may be stamped from steel stock, with each blade being drilled with the openings or slot to accept the pins or pivot member, respectively, and then heat-treated to increase its hardness. The recess may be formed using a milling or grinding tool or a wire EDM as well. There are usually two to six blade changes before the arbor needs to be replaced.

While the deburring tools of the related art generally perform satisfactorily, they are not without their respective problems. For example, to replace a worn-out blade of some of the deburring tools of the related art, an operator must remove the deburring tool from a rotatable tool holder or chuck of a drive motor, drive the pins completely through the corresponding openings in the blade and out of the arbor, remove the blade from the arbor, replace the blade with a new blade, and then drive the pins back into the arbor and through the corresponding openings in the new blade. This process is inconvenient and time-consuming and, therefore, expensive. In addition to this problem, the roll pin has a limited useful life of approximately one to three cutting-tool changes. Even with the deburring tool of the related art having a blade that can be replaced without need to drive pins in and out of the arbor, the operator must still rotate the screw and pivot member with a tool such that the worn-out blade can slide out of the arbor and the new blade can slide into the arbor.

Thus, there is a need in the related art for a more convenient, cost-effective deburring tool that is made using high-quality tool steel. More specifically, there is a need in the related art for a deburring tool that makes changing a worn-out blade thereof easier, faster, and tool-free and, thereby, reduces down-time in any deburring operation to increase the efficiency thereof.

SUMMARY OF THE INVENTION

The present invention overcomes the problems in the related art in a deburring tool adapted to be rotatably mounted in a chuck of a drive motor for performing deburring operations. The deburring tool includes a blade having a cutting head portion defined at one end of the blade, an anchor portion defined at the other end of the blade, and a retention spring. An arbor is adapted to receive and removably mount the blade such that the head portion of the blade is adapted to be elevated a predetermined distance from the arbor in an unstressed condition of the blade. The blade is sufficiently resiliently yieldable such that the head portion of the blade can move inwardly relative to the arbor during deburring operations. A holder is adapted to mount the arbor and an adjustment member, which is supported within the holder and adapted to operatively engage the anchor portion of the blade. The anchor portion of the blade is adapted to move in response to adjustment of the adjustment member in a direction substantially opposite that of the head portion and flex to control the attitude of the head portion relative to the arbor by elevating the head portion relative to the arbor for deburring operations or recessing the head portion relative to the arbor.

An advantage of the deburring tool of the present invention is that each of the blade and arbor can be easily changed or adjusted independently of one another, and, thus, the deburring tool provides faster, more convenient, and cost-effective blade and arbor changes than do the deburring tools of the related art.

Another advantage of the deburring tool of the present invention is that the blade can be changed or adjusted without removing the arbor.

Another advantage of the deburring tool of the present invention is that the blade thereof can be retained relative to the arbor and flex and adjustably pivot in a stressed condition of the blade during deburring operations.

Another advantage of the deburring tool of the present invention is that each of the blade and arbor has a simple, efficient design to allow for low-cost manufacturing of the blade and arbor from durable and very hard M-2 high-speed tool steel.

Another advantage of the deburring tool of the present invention is that it allows the holder to be left in the chuck while the blade and/or arbor are/is changed or adjusted, thereby eliminating a need to reset positions/movements of the chuck and/or drive motor and reducing downtime in any deburring operation to increase the efficiency thereof.

Another advantage of the deburring tool of the present invention is that it can be an adjustable-position deburring tool or a fixed-position deburring tool.

Another advantage of the deburring tool of the present invention is that each of the blade and arbor is interchangeable between a holder of the arbor of an adjustable-position deburring tool and a holder of the arbor of a fixed-position deburring tool of the same size.

Another advantage of the deburring tool of the present invention is that it includes mounting parts that last much longer than the mounting parts of the deburring tools of the related art.

Another advantage of the deburring tool of the present invention is that most of the mechanics of the deburring tool are contained within the holder.

Another advantage of the deburring tool of the present invention is that no holes are required to be formed in the arbor.

Another advantage of the deburring tool of the present invention is that the retention spring helps to maintain position of the remainder of the blade.

Another advantage of the deburring tool of the present invention is that the arbor can prevent excessive movement of the anchor portion of the blade in one direction and, thus, elevation of the head portion of the blade relative to the arbor to prevent breakage of the head portion during deburring operations.

Another advantage of the deburring tool of the present invention is that the adjustment member operatively applies a force upon the anchor portion of the blade in only one direction.

Another advantage of the deburring tool of the present invention is that it can prevent the adjustment member from self-adjusting during deburring operations.

Another advantage of the deburring tool of the present invention is that it is relatively attractive and simple and inexpensive to use.

Other objects, features, and advantages of the deburring tool of the present invention will be readily appreciated as the same becomes better understood while reading the subsequent description taken in conjunction with the accompanying drawings.

BRIEF DESCRIPTION OF THE DRAWINGS

FIG. 1 is a sectional side view of a first embodiment of the deburring tool of the present invention illustrating an adjustable-position deburring tool.

FIG. 2 is a side view of the arbor of the deburring tool of the present invention shown in FIG. 1.

FIG. 3 is a top view of the arbor of the deburring tool of the present invention shown in FIG. 1.

FIG. 4 is a partial side view of the blade of the deburring tool of the present invention shown in FIG. 1 illustrating the blade in structural relationship with the reaction member and retention pin of the deburring tool.

FIG. 4A is an enlarged front view of a slot defined by the blade of the deburring tool of the present invention shown in FIG. 1 illustrating bearing surfaces of the blade.

FIG. 4B is an enlarged front view of a slot defined by the blade of the deburring tool of the present invention shown in FIG. 1 illustrating the bearing and non-bearing surfaces of the blade.

FIG. 5 is a side view of the pivot cradle of the deburring tool of the present invention shown in FIG. 1.

FIG. 6 is a top view of the pivot cradle of the deburring tool of the present invention shown in FIG. 1.

FIG. 7 is a sectional side view of the pivot cradle of the deburring tool of the present invention shown in FIG. 1 illustrating the pivot cradle in structural relationship with the clip blade, pivot pin, and reaction member of the deburring tool.

FIG. 12 is a sectional side view of the holder of the deburring tool of the present invention shown in FIG. 1 in structural relationship with the pivot cradle, retention pin, reaction member, adjusting screw, and stop pin of the deburring tool.

FIG. 13 is a sectional side view of a second embodiment of the deburring tool of the present invention illustrating a fixed-position deburring tool.

FIG. 16 is a sectional side view of a third embodiment of the deburring tool of the present invention illustrating a fixed-position deburring tool.

FIG. 17 is a top view of the deburring tool of the present invention shown in FIG. 16.

FIG. 18 is a side view of the blade of the deburring tool of the present invention shown in FIG. 16.

FIG. 19 is a sectional side view of a fourth embodiment of the deburring tool of the present invention illustrating an adjustable-position deburring tool during a deburring operation.

FIG. 20 is a sectional side view of the deburring tool of the present invention shown in FIG. 19 illustrating the head portion of the blade of the deburring tool totally elevated relative to the arbor in the unstressed condition of the blade.

FIG. 25 is a sectional side view of a fifth embodiment of the deburring tool of the present invention illustrating an adjustable-position deburring tool and the head portion of the blade of the deburring tool totally elevated relative to the arbor in the unstressed condition of the blade.

FIG. 26 is a sectional side view of the deburring tool of the present invention shown in FIG. 25 illustrating the head portion of the blade of the deburring tool partially elevated relative to the arbor in the unstressed condition of the blade.

FIG. 27 is a side view of the holder of the deburring tool of the present invention shown in FIG. 25.

FIG. 28 is a sectional side view of a sixth embodiment of the deburring tool of the present invention illustrating a fixed-position deburring tool and the head portion of the blade of the deburring tool totally elevated relative to the arbor in the unstressed condition of the blade.

FIG. 29 is a sectional side view of a seventh embodiment of the deburring tool of the present invention illustrating an adjustable-position deburring tool and the head portion of the blade of the deburring tool totally elevated relative to the arbor in the unstressed condition of the blade.

FIG. 30 is a sectional side view of the deburring tool of the present invention illustrating the head portion of the blade of the deburring tool partially elevated relative to the arbor in the unstressed condition of the blade.

DETAILED DESCRIPTION OF PREFERRED EMBODIMENTS OF THE INVENTION

Figure 9:
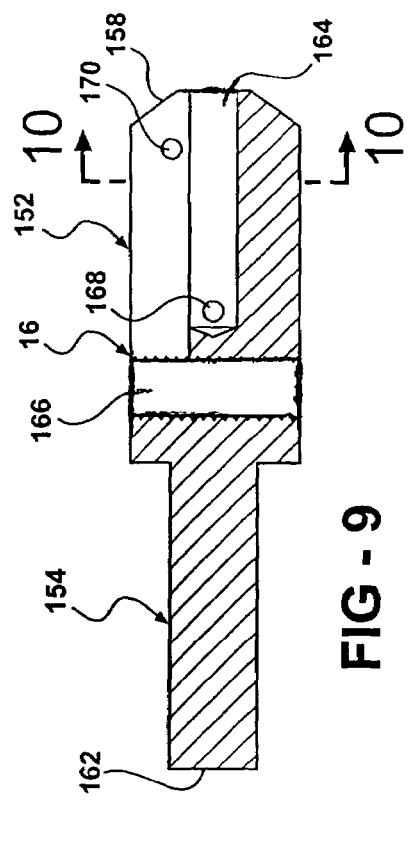
FIG. 9 is a sectional side view of the holder of the deburring tool of the present invention shown in FIG. 1 taken substantially along line "9-9" of FIG. 10.

Referring now to the figures, where like numerals are used to designate like structure, a deburring tool of the present invention is generally indicated at 10 in FIG. 1, 210 in FIG. 13, 410 in FIG. 16, 610 in FIG. 19, 810 in FIG. 25, 1010 in FIG. 28, and 1210 in FIG. 29. Embodiments of the deburring tool 10, 610, 810, 1210 shown in FIGS. 1, 19, 25, and 29, respectively, are of the adjustable-position type, and embodiments of the deburring tool 210, 410, 1010 shown in FIGS. 13, 16, and 28, respectively, are of the fixed-position type. The difference between the adjustable-position deburring tools 10, 610, 810, 1210 and the fixed-position deburring tools 210, 410, 1010 is explained below.

Independent of the type, each embodiment of the deburring tool 10, 210, 410, 610, 810, 1010, 1210 includes the following structural features common to all of the embodiments, unless expressly stated otherwise. Although these features of each of the embodiments of the deburring tool 10, 210, 410, 610, 810, 1010, 1210 are shown in the respective figures, these features will now be described in connection with only the deburring tool 10 and shown with reference to only FIGS. 1-12.

The deburring tool 10 is adapted to be rotatably mounted in a rotatable tool holder or chuck (not shown) of a drive motor (not shown) to perform deburring operations. Moreover, as shown in FIG. 1, the deburring tool 10 generally includes a blade, generally indicated at 12, and an arbor, generally indicated at 14.

More specifically, the blade 12 is replaceable and unitary and defines a longitudinal axis. The blade 12 has a cutting head portion, generally indicated at 44, defined at one end thereof; a resilient flex portion, generally indicated at 46, extending from the head portion 44; and a retaining portion, generally indicated at 48, extending from the flex portion 46. The blade 12 also has a top surface 52 and a bottom surface 54 disposed spaced from and generally parallel to the top surface 52. Each of the head portion 44, flex portion 46, and retaining portion 48 will now be described in further detail.

The head portion 44 is of a substantially trapezoidal side cross-section and has a non-cutting top surface 56, a cutting leading surface 58 extending from the edge of the top surface 56 opposite the flex portion 46 at an obtuse angle with respect to the top surface 56. The head portion 44 also has a cutting trailing surface 60 extending from the opposite edge of the top surface 56 at an obtuse angle with respect to the top surface 56. The head portion 44 also has a front surface 62 disposed substantially perpendicularly to the top surface 56 and a bottom surface 64 disposed substantially parallel with the top surface 56. Preferably, the leading surface 58 and the trailing surface 60 extend from the respective edges of the top surface 56 at a substantially identical obtuse angle with respect to the top surface 56, such as 135°. However, those having ordinary skill in the related art will appreciate that the leading surface 58 and the trailing surface 60 can extend from the respective edges of the top surface 56 at any suitable angle with respect to the top surface 56.

Those having ordinary skill in the related art will appreciate that the head portion 44 can have any suitable shape, size, and structure. Furthermore, resistance to wear of the head portion 44 can be critical. Accordingly, the head portion 44 is made preferably of a hard, or an upgraded-quality, steel, such as high-speed M-2 tool steel.

The flex portion 46 is elongated and extends integrally from the head portion 44 and the retaining portion 48. The flex portion 46 also tapers from the retaining portion 48 to the head portion 44. More specifically, the top surface 52 of the flex portion 46 is substantially parallel with the top surface 56 of the head portion 44, but the bottom surface 54 of the flex portion 46 tapers from the retaining portion 48 to the bottom surface 64 of the head portion 44. The flex portion 46 is also substantially flexible and flat and defines a longitudinal axis of the blade 12. The head portion 44 and the flex portion 46 are adapted to be disposed within the arbor 14. Those having ordinary skill in the related art will appreciate that the flex portion 46 can have any suitable shape, size, and structure.

The retaining portion 48 extends integrally from the flex portion 46. The retaining portion 48 includes a key-hole-type slot 76 adapted to receive a retention/pivot pin, generally indicated at 22. Although the pin 22 serves to removably retain the blade 12 relative to the retention pin 22 and allow the flex portion 46 to flex and adjustably pivot about the retention pin 22, for simplicity, the pin (and corresponding hole) is referred to hereinafter as the retention pin 22 (retention-pin hole). More specifically, the retention pin 22 and the slot 76 cooperate to retain the blade 12 relative to the retention pin 22 in a stressed condition of the blade 12 when the blade 12 moves inwardly with respect to the arbor 14 during deburring operations.

More specifically, the bottom surface 54 of the retaining portion 48 and the slot 76 define an open-arced, partially circumferential surface 78 and an opening 80. The bottom surface 54 disposed opposite the head portion 44 and adjacent the opening 80 defines an obtuse angle "α" with respect to the surface 78. As is described in greater detail below, the retaining portion 48 is adapted to be removably mounted onto the retention pin 22, and the slot 76 and the opening 80 act to facilitate this mounting action.

As shown in FIGS. 1, 13, 19, and 28, each of only the retaining portions 48, 248, 648, 1048 forms a stairway from the flex portion 46, 246, 646, 1046. With respect to the deburring tool 10, the retaining portion 48 defines a bottom step 66, a top step 68, and a riser 70 disposed between the bottom step 66 and top step 68. The top step 68 is disposed substantially parallel with the bottom step 66, and the riser 70 is disposed substantially perpendicularly to the bottom step 66 and top step 68.

The curved edges 72 formed between the bottom step 66 and the riser 70 are substantially arcuate. The edge 74 formed between the riser 70 and the top step 68 is substantially diagonal. The slot 76 is defined between the riser 70 and the top step 68 and extends at least partially into a side surface of the retaining portion 48. The bottom surface 54 of the retaining portion 48 disposed proximate the flex portion 46 and adjacent the opening 80 is integral with the riser 70.

Returning to the common features of each of the embodiments with reference to the deburring tool 10, the blade 12 is mounted relative to the arbor 14 such that the blade 12 projects a predetermined distance from the arbor 14 in an unstressed condition of the blade 12. The blade 12 is sufficiently resiliently yieldable such that it can move inwardly with respect to the arbor 14 during deburring operations. The blade 12 must be sufficiently strong, durable, and wear-resistant.

The arbor 14 is elongated, substantially cylindrical, and replaceable and adapted to support the blade 12. The arbor 14 includes a body, generally indicated at 30, that defines a longitudinal axis and has a head portion 32 disposed at one end of the body 30 and a tail portion 34 disposed at the other end of the body 30.

The body 30 also has a channel, generally indicated at 36, extending diametrically into the body 30. The body 30 also has a chip slot 38 disposed integrally with a side of a portion of the channel 36 proximate the head portion 32 for collecting metal burrs cut by the blade 12 during operation of the deburring tool 10. Without the chip slot 38, the burrs would wedge into the channel 36 and bind with the blade 12.

It will be appreciated by those having ordinary skill in the related art that the channel 36 can have any suitable shape and size and structural relationship with respect to the arbor 14 and blade 12 to support the blade 12. It will be further appreciated that the channel 36 can be formed by any suitable method and device, such as by a wire electrical-discharge machine (EDM) or milling or grinding tools.

Preferably, the tail portion 34 is longer than the head portion 32 of the arbor 14. The outermost end of the tail portion 34 defines a substantially rectangular cross-section, and the outermost end of the head portion 32 defines a substantially frustoconical cross-section. Also preferably, the body 30 and the channel 36 define a pair of flat sides 40 disposed in spaced, parallel relationship with respect to one another and each of which extends from the head portion 32 to the tail portion 34. In addition, the body 30 and the channel 36 define a pair of flat ends 42 disposed in spaced, parallel relationship with respect to one another and each of which extends from one side 40 to the other side 40. The blade 12 is adapted to be removably supported between the sides 40.

As shown in FIGS. 1, 13, 19, 25, and 28, each of only the deburring tools 10, 210, 610, 810, 1010 includes a holder. With respect to the deburring tool 10, the holder, generally indicated at 16, is adapted to receive and mount both the arbor 14 and the blade 12 independently of one another. In particular, the retaining portion 48 of the blade 12 is adapted to be received and mounted within the holder 16 in the assembled state of the deburring tool 10. The holder 16 is also adapted to support the retention pin 22, a stop pin 26, and a clamp screw (not shown), which are described in detail below, within the holder 16.

The holder 16 has a central opening, also known as the arbor hole 164, adapted to receive and mount the arbor 14 such that the deburring tool 10 may be mounted in the drive motor. More specifically, the holder 16 includes a substantially cylindrical mandrel, generally indicated at 152, having a first diameter. The holder 16 also includes a substantially cylindrical shank, generally indicated at 154, integrally and co-axially extending from an end surface 156 of the mandrel 152. The shank 154 has a second diameter smaller than the first diameter of the mandrel 152. The end surface 158 of the mandrel 152 disposed opposite the shank 154 is shaped like a partial right-circular cone. The end surface 156 of the mandrel 152 is formed substantially at a right angle with respect to the circumference of the mandrel 152. The end surfaces 162 of the shank 154 are formed substantially at a right angle with respect to the circumference of the shank 154 and substantially parallel with the end surface 156 of the mandrel 152. The shank 154 is adapted to be received by the chuck of the drive motor.

The mandrel 152 also includes a stop-pin hole 168 and a retention-pin hole 170. Each of the holes 164, 168, 170 has a substantially circular transverse cross-section. In addition, the mandrel 152 also has a clamp-screw hole 172. Each of the holes 164, 168, 170, 172 will now be described in further detail.

The arbor hole 164 extends through the substantial center longitudinal line of the mandrel 152 from the end of the mandrel 152 disposed opposite the shank 154 to greater than midway into the mandrel 152.

The stop-pin hole 168 is disposed completely diametrically through the mandrel 152, in general, and the end of the arbor hole 164 disposed opposite the end surface 158 of the mandrel 152. The stop-pin hole 168 is also disposed substantially perpendicularly to the arbor hole 164. The stop-pin hole 168 is adapted to receive the stop pin 26 to stop the arbor 14 from extending any farther into the mandrel 152.

The clamp-screw hole 172 is disposed diametrically through the mandrel 152 to the arbor hole 164 and substantially perpendicularly to the arbor hole 164 and substantially parallel to the stop-pin hole 168. The clamp-screw hole 172 is adapted to receive the clamp screw, such as an Allen screw, to clamp the arbor 14 into position within the mandrel 152. The clamp-screw hole 172 is disposed also substantially equidistantly from the stop-pin hole 168 and the retention-pin hole 170. Since the arbor 14 is fastened in the holder 16 with an Allen screw, for instance, a tool, such as an Allen wrench, is required to replace the arbor 14.

The retention-pin hole 170 is disposed completely through the mandrel 152 as a chord, in general, above the arbor hole 164. More specifically, the central portion of the retention-pin hole 170 is disposed more closely to the arbor hole 164 than to the circumference of the mandrel 152. The retention-pin hole 170 is disposed also substantially perpendicularly to the arbor hole 164 and substantially parallel to the stop-pin hole 168 and the clamp-screw hole 172. The retention-pin hole 170 is adapted to receive the retention pin 22 to provide the pivot point "+" about which the blade 12 can pivot into and out of the channel 36 of the arbor 14. The retention-pin hole 170 is also disposed substantially equidistantly from the clamp-screw hole 172 and the end of the mandrel 152 disposed opposite the shank 154.

It will be appreciated by those having ordinary skill in the related art that the blade 12, arbor 14, and holder 16, in general, can have any suitable shape, size, and structure and structural relationship with respect to each other. It will be further appreciated that the individual elements, in particular, of the blade 12, arbor 14, and holder 16 can have any suitable shape, size, and structure and structural relationship with respect to each other.

Referring now to FIGS. 1-12, in a first embodiment of the deburring tool 10, the blade 12 includes a clip portion, generally indicated at 50, and the holder 16 is adapted to support a pivot cradle, generally indicated at 18, and an adjusting member, generally indicated at 20. Each of the clip portion 50, holder 16, pivot cradle 18, and adjusting member 20 is described in detail below. Since, as shown in FIGS. 13-18, the blade 212, 412 has the clip portion 250, 450 as well, the clip portion 250, 450 will now be described with reference to the clip portion 50.

The clip portion 50 extends integrally from the retaining portion 48 and defined substantially at the end of the blade 12 disposed opposite the head portion 44 of the blade 12. The clip portion 50 is adapted to flex to provide a spring-like force acting along the blade 12 toward the head portion 44 to facilitate insertion and removal of the blade 12 relative to the deburring tool 10 without use of any tools.

As shown in FIGS. 1 and 13, the retaining portion 48, 248 forms the stairway to the clip portion 50, 250. In a preferred embodiment of the deburring tool 10, 210, the longitudinal axis of the clip portion 50, 250 is disposed in longitudinally spaced relation with respect to the longitudinal axis of the flex portion 46, 246.

Referring specifically only to the deburring tool 10, the clip portion 50 extends integrally from the retaining portion 48. The clip portion 50 includes a lower jaw, generally indicated at 82, and an upper jaw, generally indicated at 84, disposed in spaced relation to the lower jaw 82. The lower jaw 82 and upper jaw 84 are adapted to flex with respect to each other to provide the spring-like force that aids in retaining the blade 12 in the mounted condition with respect to the arbor 14 during deburring operations.

The lower jaw 82 and upper jaw 84 form the back of the blade 12 and face the left as viewed in FIG. 4. The upper jaw 84 is arcuately shaped. However, those having ordinary skill in the related art will appreciate that the upper jaw 84 can have any suitable shape. The space defined between the lower jaw 82 and upper jaw 84 extends partially and substantially longitudinally into the clip portion 50 and forms an arcuate slot 86 that is concave with respect to the lower jaw 82. The end of the slot 86 disposed proximate the retaining portion 48 is rounded, the end of the slot 86 disposed opposite the retaining portion 48 is open, and the sides of the slot 86 are substantially parallel with respect to one another. Preferably, the lower jaw 82 has a depth that is substantially greater than the depth of the upper jaw 84.

The clip portion 50 further includes a reaction member 24 that is operatively engaged by the lower jaw 82 and upper jaw 84. The lower jaw 82 and upper jaw 84 are adapted to flex against the reaction member 24 to provide the spring-like force toward the head portion 44. The reaction member 24 is adapted to support the blade 12 relative to the deburring tool 10 upon flexing of the lower jaw 82 and upper jaw 84.

More specifically, the open end of the slot 86 defines a clearance 88 that substantially broadens outwardly from the slot 86 and is adapted to receive the reaction member 24. Preferably, the reaction member is a clip pin 24 that extends substantially transversely to the longitudinal axis of the blade 12.

Beginning at point 90 of the top of the lower jaw 82 defining the open end of the slot 86, the lower jaw 82 extends substantially vertically toward the bottom surface 54 of the clip portion 50 for a predetermined distance, then substantially at an acute angle with respect to the clearance 88 for a predetermined distance, then substantially concave with respect to the clearance 88 for a predetermined distance, and then substantially horizontally to point 92 at the back of the blade 12. From the point 92, the lower jaw 82 extends, forming a back surface 94 of the lower jaw 82, substantially vertically toward the bottom surface 54 of the clip portion 50. The edge 96 joining the back surface 94 and the bottom surface 54 of the clip portion 50 is substantially arcuate. The clearance 88 is disposed more closely to the bottom surface 54 of the clip portion 50 than is the slot 86, and a substantial portion of the clearance 88 is disposed more closely to the back of the blade 12 than is the slot 86.

Beginning at point 98 of the bottom of the upper jaw 84 defining the open end of the slot 86, the upper jaw 84 extends substantially vertically toward the bottom surface 54 of the clip portion 50 for a predetermined distance to arc 100, then substantially concave with respect to the edge 102 joining the top surface 52 of the clip portion 50 and the back of the blade 12 for a predetermined distance, and then substantially diagonally to point 104 at the back of the blade 12. From the point 104, the upper jaw 84 extends, forming a back surface 106 of the upper jaw 84, substantially vertically to the edge 102. The edge 102 is substantially arcuate. The back surface 94 and back surface 106 are spaced from and substantially parallel and aligned with respect to one another.

As shown in FIGS. 1 and 13, like the retaining portion 48, 248, the clip portion 50, 250 is supported within the holder 16, 216 in the assembled state of the deburring tool 10, 210.

Referring now again only to the deburring tool 10, as the upper jaw 84 is activated by a hand of an operator of the deburring tool 10, for instance, the blade 12 is forced forward, or in a direction toward the head portion 44, resulting in the retention pin 22 retaining the retaining portion 48. Conversely, when the blade 12 is forced rearward, or in a direction toward the clip portion 50, the retaining portion 48 is released from the retention pin 22, thus allowing for removal of the blade 12 from the arbor 14.

It will be appreciated by those having ordinary skill in the related art that the retaining portion 48 and the clip portion 50 can have any suitable shape, size, and structure and structural relationship with respect to one another to allow the flex portion 46 of the blade 12 to flex during the deburring process. In other words, the retaining portion 48 and the clip portion 50 must be designed such that the retention pin 22 can retain the retaining portion 48 and the retaining portion 48 can be released from the retention pin 22, thus allowing for removal of the blade 12 from the arbor 14.

As shown in FIG. 1, the pivot cradle 18 is adapted to fixedly mount and pivotally support the blade 12 and to adjust the predetermined distance that the cutting head 44 projects from the arbor 14 in an unstressed condition. More specifically, the pivot cradle 18 is also adapted to receive the retention pin 22 and the clip pin 24, for instance, and be received within the adjusting member 20. Preferably, the adjusting member is an adjusting screw 20. Even more specifically, the pivot cradle 18 is adapted to support the retaining portion 48 and the clip portion 50 of the blade 12 within the holder 16. The pivot cradle 18 will now be described in further detail with reference to FIGS. 5, 6, and 8.

Figure 8:
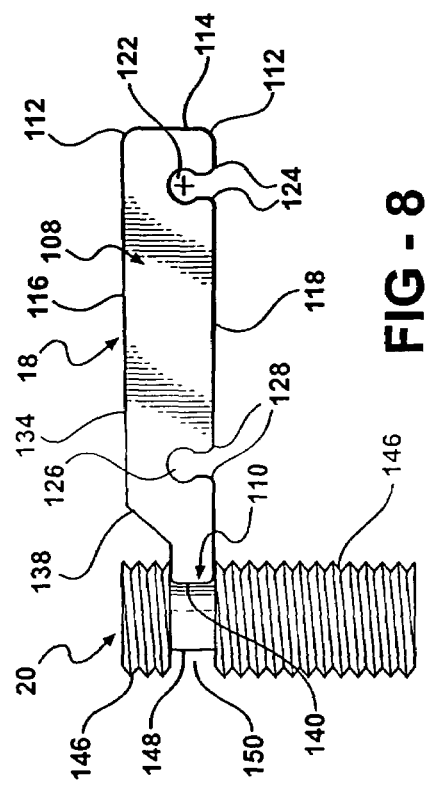
FIG. 8 is a side view of the pivot cradle of the deburring tool of the present invention shown in FIG. 1 illustrating the pivot cradle in structural relationship with the adjusting screw of the deburring tool and the pivot point about which the blade can pivot.

As shown in FIGS. 5, 6, and 8, the pivot cradle 18 includes a body portion, generally indicated at 108, having a slot 132 adapted to support the blade 12. The body portion 108 is adapted to pivot about the retention pin 22 so as to adjust the predetermined distance that the cutting head 44 projects from the arbor 14 in the unstressed condition.

More specifically, the pivot cradle 18 also includes a tail portion, generally indicated at 110, that integrally extends from an end surface of the body portion 108. The body portion 108 is substantially rectangular in side cross-section. As shown in FIG. 6, the top cross-section of the pivot cradle 18 resembles a substantially clothes-pin shape. The body portion 108 is adapted to receive the retention pin 22 and the clip pin 24, and the tail portion 110 is adapted to be received by the adjusting screw 20.

As shown in FIGS. 5 and 8, edges 112 joining end surface 114 of the body portion 108 opposite the tail portion 110 to top and bottom surfaces 116, 118, respectively, of the body portion 108 are substantially arcuate. As shown only in FIG. 5, end surface 120 of the body portion 108 proximate the tail portion 110 forms a substantial right angle with respect to each of the top and bottom surfaces 116, 118, respectively. The top surface 116 tapers slightly toward the tail portion 110 such that the top and bottom surfaces 116, 118, respectively, are not parallel with respect to one another. The end surfaces 114, 120 are substantially parallel with respect to one another.

The body portion 108 defines an open-ended slot 122 that is disposed proximate the bottom surface 118 and the end surface 114 and opens to/from the bottom surface 118. Each of edges 124 defined by the slot 122 and the bottom surface 118 is substantially concave with respect to the interior of the body portion 108. As best shown in FIG. 6, the slot 122 extends completely from one side of the body portion 108 to the other side of the body portion 108. The slot 122 is adapted to receive the retention pin 22, which holds the pivot cradle 18 in position as well as provides a pivot point "+," as shown in FIG. 8, about which the blade 12 can pivot into and out of the channel 36 of the arbor 12, which is shown in FIG. 3, using the adjusting screw 20, to be described in detail below.

Returning to FIGS. 5 and 8, the body portion 108 also defines another slot 126 that is disposed proximate the bottom surface 118 and the end surface 120 and opens to/from the bottom surface 118. Each of edges 128 defined by the slot 126 and the bottom surface 118 is a vertex of a substantial right angle. As best shown in FIG. 6, the slot 126 extends completely from one side of the body portion 108 to the other side of the body portion 108. The slot 126 is adapted to receive the clip pin 24 such that the clip pin 24 extends preferably just beyond each end of the slot 126. The clip pin 24 does not extend to respective sides of the holder 16.

As shown in a top cross-section of the pivot cradle 18 in FIG. 6, the body portion 108 preferably includes a pair of prongs 130 having substantially identical dimensions and extending substantially to the end surface 114. The slot 132 defined between the prongs 130 has substantially the same dimensions as the prongs 130 have. The slots 122, 126 and, thus, the retention pin 22 and the clip pin 24, respectively, are adapted to penetrate completely through both prongs 130 and the slot 132.

As shown in FIGS. 5, 6, and 8, the slot 122 is disposed farther from the end surface 114 than the slot 126 is disposed from the end surface 120. The slots 122, 126 are substantially round and of substantially the same size and disposed a substantially equal distance from the bottom surface 118 such that the slots 122, 126 are substantially aligned. However, those having ordinary skill in the related art will appreciate that the slots 122, 126 can have any suitable size, shape, and placement on the body portion 108, in particular, and the body portion 108 can have any suitable size and shape, in general, to receive the retention and clip pins, 22, 24, respectively.

As shown in FIGS. 5 and 8, the tail portion 110 extends integrally and co-extensively from the body portion 108 and, from a side cross-section of the pivot cradle 18, resembles a stairway having a top step 134, a bottom step 136, and a riser 138 between the top and bottom steps 134, 136, respectively. The top step 134 is disposed adjacent the body portion 108, the riser 138 extends diagonally away from the body portion 108, and the bottom step 136 is disposed about half of the depth of the tail portion 110 from the top step 134. As shown in FIG. 6, the bottom step 136 is also longitudinally centered with the riser 138 and the top step 134, but the sides of the bottom step 136 are substantially equidistantly inset from the respective sides of the riser 138 and the top step 134.

As shown in FIG. 5, end surfaces 140, 142 of the tail portion 110 are substantially parallel with respect to one another and the end surfaces 114, 120 of the body portion 108. The top of the bottom step 136 and the bottom surface 144 of the tail portion 110 are substantially parallel with respect to one another and the bottom surface 118 of the body portion 108.

As shown in FIGS. 1, 8, and 12, the tail portion 110 is adapted to be received within the adjusting screw 20. In this regard and as shown in FIGS. 1 and 12, the adjusting screw 20 is substantially cylindrical and extends through and is threadedly mounted within the holder 16. The longitudinal axis of the adjusting screw 20 extends substantially normal to the longitudinal axis of the holder 16.

As shown in FIGS. 1, 8, and 12, the adjusting screw 20 is formed with two threaded portions 146 and a non-threaded portion 148 disposed between the threaded portions 146 and substantially off longitudinal center of the adjusting screw 20. The threaded portions 146 are of substantially uniform diameter, and the threaded portion 146 proximate the bottom surface 144 of the tail portion 110 is longer than the other threaded portion 146. The non-threaded portion 148 is of substantially uniform diameter, which is smaller than that of the threaded portions 146, and is shorter than each of the threaded portions 146. The threaded and non-threaded portions 146, 148, respectively, define an annular groove 150 that is adapted to receive the bottom step 136 of the tail portion 110. The bottom step 136 projects into engagement with the non-threaded portion 148 and is held there by the clamping force of the resulting threaded portions 146.

A recess can be formed in either end or both ends of the adjusting screw 20 for receiving a tool (not shown) to rotatably adjust the adjusting screw 20. Rotation of the adjusting screw 20 causes the pivot cradle 18 and, thus, the blade 12 to pivot about the retention pin 22 to adjust the unstressed position of the head portion 44 of the blade 12 with respect to the channel 36 of the arbor 14. This ability to so adjust defines the adjustable-position deburring tool 10.

More specifically, rotation of the adjusting screw 20 lowers or raises, depending upon the direction of rotation, the adjusting screw 20 within the holder 16. Since the bottom step 136 of the tail portion 110 of the pivot cradle 18 is received within the annular groove 150 defined by the adjusting screw 20, the tail portion 110 moves tandemly downward or upward with the adjusting screw 20. This movement of the tail portion 110 causes the body portion 108 of the pivot cradle 18 to pivot clockwise or counter-clockwise, depending upon the direction of movement, about the retention pin 22. Since the body portion 108 supports the blade 12, the blade 12 tandemly pivots with the body portion 108 to adjust the unstressed position of the head portion 44 of the blade 12 with respect to the channel 36 of the arbor 14.

As shown in FIGS. 9-12, the holder 16 has a cradle pocket 174 that is adapted to receive and mount the pivot cradle 18. The adjusting screw 20 is operatively supported for adjustable movement in the holder 16 so as to engage the tail portion 110 of the pivot cradle 18 and, thereby, adjustably pivot the pivot cradle 18 about the retention pin 22.

Figure 11:
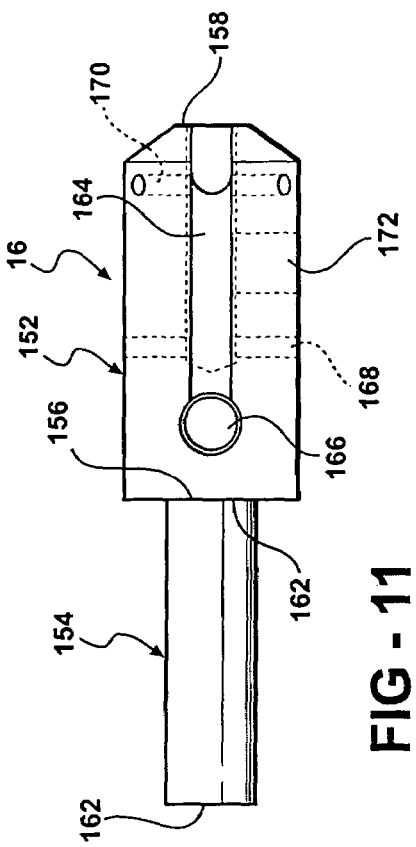
FIG. 11 is a top view of the holder of the deburring tool of the present invention shown in FIG. 1.
Figure 10:
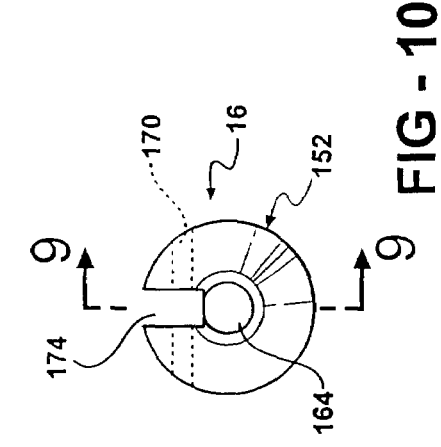
FIG. 10 is a front view of the holder of the deburring tool of the present invention shown in FIG. 1 taken substantially along line "10-10" of FIG. 9.

As shown in FIG. 12, the mandrel 152 serves to support the pivot cradle 18 within the mandrel 152. As shown in FIGS. 9 and 11, the mandrel 152 includes an adjusting-screw hole 166 having a substantially circular transverse cross-section. In addition, the mandrel 152 also has a cradle pocket 174, as shown in FIG. 10. The adjusting-screw hole 166 and cradle pocket 174 will now be described in further detail with reference to FIGS. 9-12.

The adjusting-screw hole 166 is disposed completely diametrically through the mandrel 152 and substantially perpendicularly to the arbor hole 164. The adjusting-screw hole 166 is disposed proximate and substantially perpendicularly to the stop-pin hole 168. The adjusting-screw hole 166 is adapted to receive the adjusting screw 20 to fixedly mount the pivot cradle 18 and, thus, the blade 12 in the mandrel 152 and the arbor 14 within the arbor hole 164. The adjusting-screw hole 166 is also disposed substantially equidistantly from the arbor hole 164 and the end surface 156 of the mandrel 152. The stop-pin hole 168 is disposed substantially equidistantly from the adjusting-screw hole 166 and the clamp-screw hole 172.

The retention-pin hole 170 is disposed completely through the cradle pocket 174. The retention-pin hole 170 is adapted to receive the retention pin 22 to hold the pivot cradle 18 in position as well as provide the pivot point "+" about which the blade 12 can pivot into and out of the channel 36 of the arbor 14 using the adjusting screw 20.

The cradle pocket 174 is open to the exterior of the mandrel 152 and disposed partially diametrically through the mandrel 152 to the arbor hole 164. The cradle pocket 174 is also disposed substantially perpendicularly to both the arbor hole 164 and the retention-pin hole 170 (or substantially parallel to the adjusting-screw hole 166). The cradle pocket 174 is adapted to accept the pivot cradle 18, is wider than the channel 36 of the arbor 14, and has a substantially rectangular transverse cross-section, as shown in FIG. 10.

As shown in FIGS. 4A and 4B, the slot 76 defines arc surfaces 176, 178 and a substantial midpoint "M." An imaginary line "H1" extends substantially horizontally through the midpoint "M" of the slot 76. Arc surface 176 subtends a predetermined angle "β" below horizontal "H1," and arc surface 178 subtends a predetermined angle "γ" above horizontal "H1." Arc surface 178 is adapted to act as a bearing surface for the retention pin 22 to retain the blade 12 relative to the retention pin 22 in the stressed condition of the blade 12, or, during a deburring operation when the retaining portion 48 applies a force upon the retention pin 22 in a substantially downward direction. As explained above, the clip portion 50 is adapted to flex to provide a spring-like force acting in the substantially forward direction. In this way, arc surface 176 is adapted to act as a bearing surface for the retention pin 22 when the deburring tool 10 is not performing a deburring operation. Arc surfaces 176, 178 combine to act as a single arc surface.

More specifically, the slot 76 also defines a radius "R" substantially equal to the radius of the retention pin 22. As shown in FIG. 4A, arc surface 176 is defined on the inner perimeter of the slot 76 and subtends the angle "β" from horizontal "H1" toward the opening 80. Arc surface 176 is adapted to retain the blade 12 in the arbor 14 upon a force being applied to the blade 12 in a substantially upward direction, such as a centrifugal or centripetal force or an operator of the deburring tool 10 removing the blade 12. Even more specifically, when the flex portion 46 of the blade 12 flexes downward during a deburring operation, the retaining portion 48 applies a force substantially downward upon the retention pin 22 to prevent the retaining portion 48 from rolling off the top of the retention pin 22. In fact, once the blade 12 is mounted in the arbor 14, only the flex portion 46 moves. The retaining and clip portions 48, 50, respectively, do not move.

Arc surface 178 is also defined on the inner perimeter of the slot 76 adjacent arc surface 176 and subtends the angle "γ" from horizontal "H1" away from arc surface 176. The sum of the angles "β" and "γ" is substantially 180°. In a preferred embodiment of the deburring tool 10, "β" is substantially 17.5°, and "γ" is substantially 162.5°.

As shown in FIG. 4B, an imaginary line "H2" extends substantially horizontally from the end of arc surface 176 proximate the opening 80, defining a point "P1," entirely across the slot 76 to opposed surface 179 of the retaining portion 48 defined by the slot 76. Arc surface 180 extends from horizontal "H2" to arc surface 178. The point where arc surface 178 and arc surface 180 meet defines a point "P2." Arc surface 180 also defines a radius substantially equal to the diameter of the retention pin 22, and point "P1" is the substantial center of this radius. Arc surface 180 subtends a predetermined angle "δ" above horizontal "H2." Horizontal "H2" also is below and substantially parallel with horizontal "H1." Surface 179 is substantially vertical and extends from horizontal "H2" in a direction toward the bottom surface 54 of the blade 12. Arc surface 180 is adapted to act as a non-bearing surface such that a space is defined between arc surface 180 and the retention pin 22 to allow translational displacement of the blade 12 relative to the retention pin 22 for mounting or removal of the blade 12.

More specifically, arc surface 180 is defined on the inner perimeter of the slot 76 and subtends the angle "δ" from horizontal "H2" away from the opening 80. Even more specifically, in any position of the blade 12, the retention pin 22 does not make contact with arc surface 180. Thus, when the blade 12 is forced upward, which also forces the blade 12 rearward toward the clip portion 50 of the blade 12, arc surface 180 provides clearance and arc surfaces 176, 178 are displaced away from contact with the retention pin 22. This displacement permits the retaining portion 48 to be released from the retention pin 22, thus allowing for removal of the blade 12 from the holder 16. In a preferred embodiment of the deburring tool 10, "δ" is substantially 17.5°.

As shown in FIG. 4B, the slot 76 also defines a substantially vertical centerline "C" through midpoint "M" that substantially perpendicularly intersects horizontals "H1" and "H2" and arc surface 178. The centerline "C" is also substantially parallel to surface 179. Surface 181 extends from point "P1" in a direction toward the bottom surface 54 of the blade 12 and away from surface 179 such that surfaces 179 and 181 are non-parallel with respect to each other.

For ease of reference in describing operation of the deburring tool 10, when moving in a counterclockwise fashion from the right side of FIG. 4B, the arc defined by the distance between horizontal "H2" and point "P2" is referred to as "A1." The arc defined by the distance between point "P2" and the centerline "C" is referred to as "A2." The arc defined by the distance between the centerline "C" and horizontal "H1" is referred to as "A3." And, the arc defined by the distance between the centerline "C" and point "P1" is referred to as "A4."

Figure 15:
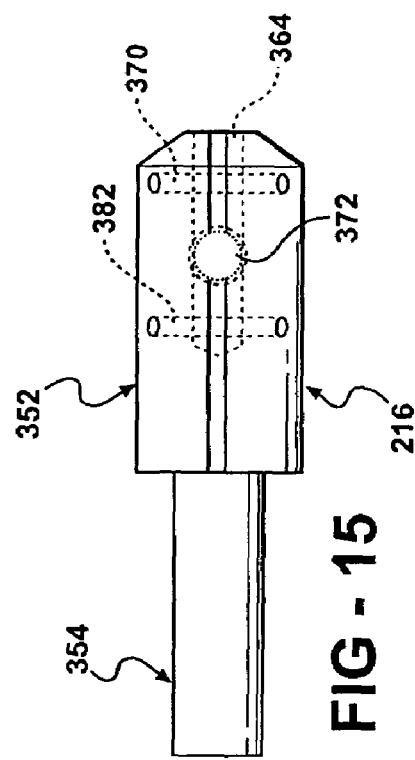
FIG. 15 is a top view of the holder of the deburring tool of the present invention shown in FIG. 13.
Figure 14:
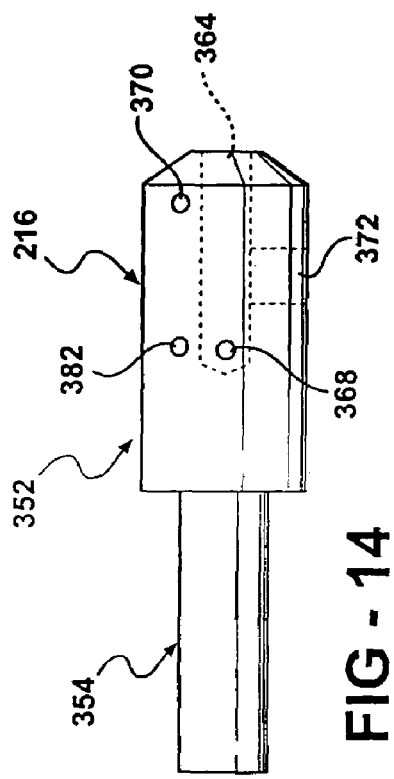
FIG. 14 is a side view of the holder of the deburring tool of the present invention shown in FIG. 13.

Referring now to FIGS. 13-15, where like numerals increased by 200 are used to represent structure like that of the deburring tool 10, a second embodiment of a deburring tool of the present invention, generally indicated at 210, is shown. The holder 216 is adapted to support a clip pin 224 within the holder 216. Accordingly, the holder 216 includes a clip-pin hole 382. Unlike the adjustable-position deburring tool 10, the fixed-position deburring tool 210 does not include an adjusting member and a pivot cradle.

Just as with the deburring tool 10, as the upper jaw 284 is activated by a hand of an operator of the deburring tool 210, for instance, the blade 212 is forced forward, or in a direction toward the head portion 244, resulting in the retention pin 222 retaining the retaining portion 248. Conversely, when the blade 212 is forced rearward, or in a direction toward the clip portion 250, the retaining portion 248 is released from the retention pin 222, thus allowing for removal of the blade 212 from the arbor 214.

It will be appreciated by those having ordinary skill in the related art that the retaining portion 248 and the clip portion 250 can have any suitable shape, size, and structure and structural relationship with respect to one another to allow the blade 212 to flex during the deburring process. In other words, the retaining portion 248 and clip portion 250 must be designed such that when the blade 212 is forced forward by a hand of an operator of the deburring tool 210, the retention pin 222 can retain the retaining portion 248. And, when the blade 212 is forced rearward, the retaining portion 248 can be released from the retention pin 222, thus allowing for removal of the blade 212 from the arbor 214.

Referring now to FIGS. 16-18, where like numerals increased by 400 are used to represent structure like that of the deburring tool 10, a third embodiment of a deburring tool of the present invention, generally indicated at 410, is shown. Unlike the adjustable-position deburring tool 10, the fixed-position deburring tool 410 does not include an adjusting member and a pivot cradle. Unlike both the deburring tool 10 and fixed-position deburring tool 210, the deburring tool 410 does not include a holder. As such, unlike the arbors 14, 214, the arbor 414 is not fastened in a holder. Rather, the arbor 414 is fastened in the chuck of the drive motor, for instance, and, thus, cannot be changed or adjusted absent removal of the arbor 414 from the chuck. In this way, the arbor 414 is essentially a disposable tool. The arbor 414 is adapted to receive the retention pin 422 and the clip pin 424 and, thus, further includes a retention-pin hole 570 and a clip-pin hole 582. Unlike the blade 12, 212, the blade 412 is substantially straight such that the retaining portion 448 of the blade 412 does not form a stairway from the flex portion 446 to the clip portion 450 of the blade 412.

An elongated, substantially cylindrical shank 554 co-extends from and is integral with the end of the arbor 414 disposed opposite the chip slot 438. As shown in FIGS. 16 and 17, the shank 554 is shorter than the arbor 414. The shank 554 is adapted to be received by the chuck of the drive motor.

Just as with the deburring tools 10, 210, as the upper jaw 484 is activated by a hand of an operator of the deburring tool 410, for instance, the blade 412 is forced forward, or in a direction toward the head portion 444, resulting in the retention pin 422 retaining the retaining portion 448. Conversely, when the blade 412 is forced rearward, or in a direction toward the clip portion 450, the retaining portion 448 is released from the retention pin 422, thus allowing for removal of the blade 412 from the arbor 414.

It will be appreciated by those having ordinary skill in the related art that the retaining portion 448 and clip portion 450 can have any suitable shape, size, and structure and structural relationship with respect to one another to allow the blade 412 to flex during the deburring process. In other words, the retaining portion 448 and clip portion 450 must be designed such that when the blade 412 is forced forward by a hand of an operator of the deburring tool 410, the retention pin 422 can retain the retaining portion 448. And, when the blade 412 is forced rearward, the retaining portion 448 can be released from the retention pin 422, thus allowing for removal of the blade 412 from the arbor 414.

In the second and third embodiments of the deburring tool 210, 410, the blade 212, 412 is not adapted to pivot about the retention pin 222, 422 to adjust the unstressed position of the head portion 244, 444 of the blade 212, 412 with respect to the arbor 214, 414. Thus, the deburring tools 210, 410 are of the fixed-position type.

Referring now to FIGS. 19-24 and 27, where like numerals increased by 600 are used to represent structure like that of the deburring tool 10, a fourth embodiment of a deburring tool of the present invention, generally indicated at 610, is shown. The deburring tool 610 includes the structural features described above in connection with the common structural features of each of the embodiments of the deburring tool 10, 210, 410, 610, 810, 1010, 1210. In addition to those structural features, the blade 612 of the deburring tool 610 includes an anchor portion, generally indicated at 650, and an adjustment-member hole 766. Since, as shown in FIGS. 25-30, each of the blades 812, 1012, 1212 has the anchor portion 850, 1050, 1250 as well, each of the anchor portions 850, 1050, 1250 will now be described with reference to the anchor portion 650.

As shown in FIGS. 19-21 and 27, the anchor portion 650 is defined at the end of the blade 612 disposed opposite the head portion 644 of the blade 612. The blade 612 also includes a retention spring, generally indicated at 682. The holder 616 is adapted to mount an adjustment member, generally indicated at 620, supported within the holder 616 and adapted to operatively engage the anchor portion 650 of the blade 612. The anchor portion 650 is adapted to move in response to adjustment of the adjustment member 620 in a direction substantially opposite that of the head portion 644. The anchor portion 650 is also adapted to flex, along with the flex portion 646, to control the attitude of the head portion 644 relative to the arbor 614 by elevating the head portion 644 relative to the arbor 614 for deburring operations or recessing the head portion 644 relative to the arbor 614.

More specifically, the anchor portion 650 includes an upper jaw, generally indicated at 684, and a lower jaw disposed in spaced relation to the upper jaw 684 and defining the retention spring 682. A space is defined between the upper jaw 684 and the retention spring 682. The retention spring 682 is adapted to flex with respect to the upper jaw 684 to provide flexibility of the anchor portion 650 to retain the blade 612 mounted relative to the arbor 614 and to control the attitude of the head portion 644 relative to the arbor 614 in response to adjustment of the adjustment member 620.

In a preferred embodiment of the deburring tool 610, the entirety of each of the retaining portion 648 and anchor portion 650 is completely disposed within the holder 616. The anchor portion 650 is disposed between a top surface of the exterior of the arbor 614 and a top surface of the interior of the holder 616 and between the retention pin 622 and adjustment member 620.

The upper jaw 684 is substantially straight, and a portion of the upper jaw 684 defines a substantially straight top surface that tapers slightly from the retaining portion 648 toward the adjustment member 620 and a substantially straight bottom surface. The upper jaw 684 extends integrally from the retaining portion 648 and substantially parallel with the flex portion 646 of the blade 612.

An end of the upper jaw 684 disposed proximate the adjustment member 620 arcuately bends toward the exterior top surface of the arbor 614 to form an arcuate contact portion 782. An arcuate outside surface of the contact portion 782 is operatively engaged by an inside surface of the adjustment member 620 for moving the anchor portion 650.

The retention spring 682 is substantially straight, and a portion of the retention spring 682 defines a substantially straight top surface and a substantially straight bottom surface that tapers slightly from the retaining portion 648 toward the adjustment member 620. The retention spring 682 extends integrally from a portion of the upper jaw 684 disposed adjacent the retention pin 622 such that the entirety of the retention spring 682 is disposed completely within a space defined between the upper jaw 684 and arbor 614. The top surface of the retention spring 682 is adapted to be disposed in both contacting and non-contacting and, thus, parallel and non-parallel relationship with the bottom surface of the upper jaw 684.

An end of the retention spring 682 disposed proximate the contact portion 782 of the upper jaw 684 arcuately bends toward the exterior top surface of the arbor 614 to form an arcuate portion of the retention spring 682, which is disposed substantially parallel with the contact portion 782 of the upper jaw 684. The retention spring 682 is adapted to be disposed in either a relaxed/extended or partially or completely compressed state, depending upon the amount of adjustment of the adjustment member 620 and, thus, upper jaw 684 and, in turn, resulting position of the upper jaw 684 with respect to the retention spring 682.

A space is defined between the arcuate portion of the retention spring 682 and contact portion 782 of the upper jaw 684. Each of the entire length and width of the upper jaw 684 is greater than each of the entire length and width, respectively, of the retention spring 682.

The upper jaw 684 includes a limit surface 784 adapted to engage the exterior top surface of the arbor 614 for limiting the movement of the anchor portion 650 downward, and the retention spring 682 includes a contact surface 785 adapted to engage the exterior top surface of the arbor 614. In particular, the limit surface 784 and contact surface 785 each consists of a substantially flat bottom surface of the contact portion 782 of the upper jaw 684 and arcuate portion of the retention spring 682, respectively.

The adjustment member 620 defines a longitudinal axis extending substantially parallel to the path of motion of the blade 612 and perpendicular to the arbor 614. The position of the adjustment member 620 is adapted to be adjusted along its longitudinal axis. Preferably, the adjustment member is an adjustment screw 620 having a head 786 a bottom surface 787 of which is adapted to operatively engage the outside surface of the contact portion 782 of the upper jaw 684 for moving the anchor portion 650 in response to adjustment of the position of the adjustment screw 620 along its longitudinal axis. The adjustment member 620 is adapted to be adjusted to each of various levels to influence the position of the retention spring 682 and, thus, amount of elevation of the head portion 644 of the blade 612 relative to the arbor 614 and, in turn, retention or removability of the blade 612.

The deburring tool 610 includes a tension member 788 extending substantially transversely to the longitudinal axis of each of the blade 612 and adjustment screw 620 and adapted to provide transverse passive resistance to the adjustment screw 620 to prevent self-adjustment of the adjustment screw 620 during deburring operations. Such self-adjustment can be caused by vibration, for example, during deburring operations.

The stop pin 626 is disposed between the adjustment screw 620 and arbor 614 and adapted to limit the distance the arbor 614 is received within and along the holder 616. Preferably, the stop pin 626 is disposed in non-contacting relationship with the adjustment screw 620 and contacting relationship with the end surface of the arbor 614 disposed proximate the adjustment screw 620. In particular, the distance from the adjustment screw 620 to the stop pin 626 is about 0.015 inch.

Figure 21:
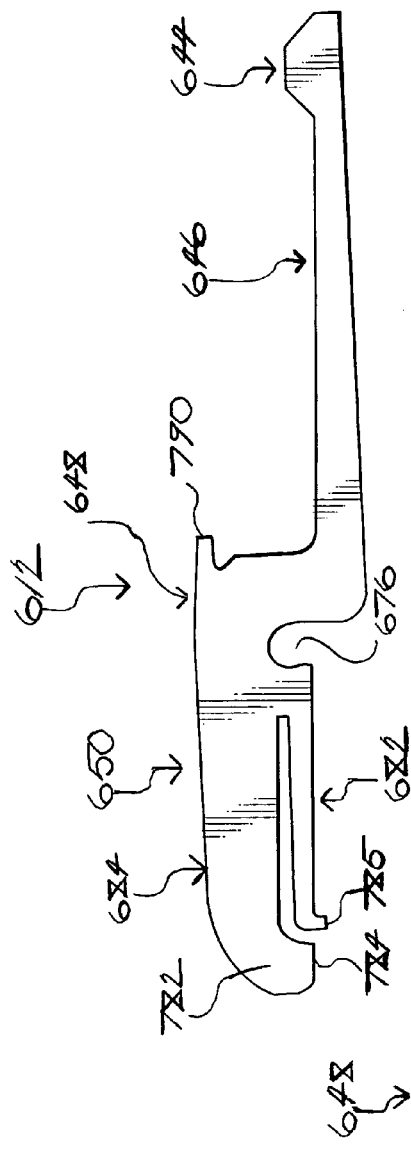
FIG. 21 is a side view of the blade of the deburring tool of the present invention shown in FIG. 19.

As shown in FIG. 21, the slot 676 of the retention portion 648 of the blade 612 is defined between the retention spring 682 and flex portion 646 of the blade 612 and adapted to receive the retention pin 622. Since, as shown in FIGS. 25-30, each of the retaining portions 848, 1048, 1248 defines the slot 876, 1076, 1276 as well, each of the slots 876, 1076, 1276 will now be described with reference to the slot 676.

As shown in FIG. 19, the retention pin 622 and slot 676 cooperate to removably retain the blade 612 relative to the retention pin 622 and allow the retention spring 682 and flex portion 646 to flex and the flex portion 646 to adjustably pivot about the retention pin 622 in a stressed condition of the blade 612 when the head portion 644 of the blade 612 moves inwardly relative to the arbor 614 during deburring operations.

Figure 22:
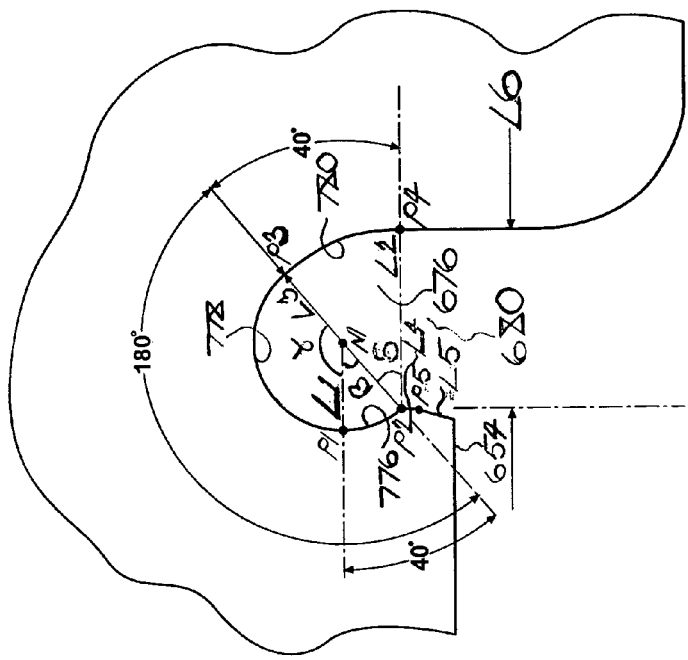
FIG. 22 is an enlarged front view of a slot defined by the blade of the deburring tool of the present invention shown in FIG. 19 illustrating bearing and non-bearing surfaces of the blade.

In a preferred embodiment of the deburring tool 610 and as viewed in FIG. 22, the slot 676 defines a substantial midpoint "M." An imaginary line "L1" extends substantially horizontally and, thus, parallel to the longitudinal axis of the blade 612 from the midpoint "M" to a point P1." Line "L1" is substantially equal to the radius of the retention pin 622. An arc surface 776 subtends a predetermined angle "β" from line "L1" to a point "P2," and arc surface 778 subtends a predetermined angle "γ" from line "L1" to a point "P3." The sum of the angles "β" and "γ" is substantially 180°. Preferably, "β" is substantially 40.0°, and "γ" is substantially 140.0°.

Arc surfaces 776, 778 act as both the pivot and retention portions of the slot 676. In particular, arc surface 778 is adapted to act as a bearing surface for the retention pin 622 to retain the blade 612 relative to the retention pin 622 in the stressed condition of the blade 612. Or, when the flex portion 646 of the blade 612 flexes substantially downward during a deburring operation, the retaining portion 648 applies a force upon the retention pin 622 in a substantially downward direction to prevent the retaining portion 648 from rolling off the top of the retention pin 622.

As explained above, the retention spring 682 is adapted to flex in response to interaction between the bottom surface 787 of the head 786 of the adjustment screw 620 and the arcuate outside surface of the contact portion 782 of the upper jaw 684, thus, provide a spring-like force acting in the substantially forward and upward direction. In this way, arc surface 776 is adapted to act as a bearing surface for the retention pin 622 when the deburring tool 610 is not performing a deburring operation. Also, arc surface 776 is adapted to retain the blade 612 in the arbor 614 upon a force being applied to the blade 612 in a substantially upward direction, such as a centrifugal or centripetal force or an operator of the deburring tool 610 removing the blade 612. Arc surfaces 776, 778 combine to act as a single bearing arc surface. In fact, once the blade 612 is mounted in the arbor 614, the flex portion 646 and upper jaw 684 can pivot about the retaining portion 648. The retaining portion 648 and retention spring 682 do not move during deburring operations. The retention spring 682 can move only during adjustment of the adjustment screw.

An imaginary line "L2" extends substantially horizontally below and, thus, parallel with line "L1" from point "P1" to a point "P4." Line "L2" defines a width of the slot 676 and is substantially equal to the diameter of the retention pin 622.

Arc surface 780 subtends a predetermined angle "δ" from point "P3" to point "P4." Arc surface 780 is adapted to act as a non-bearing surface such that a space is defined between arc surface 780 and the retention pin 622 to allow translational displacement of the blade 612 relative to the retention pin 622 for mounting or removal of the blade 612. In any position of the blade 612, the retention pin 622 does not make contact with arc surface 780. Thus, when the blade 612 is forced upward, which also forces the blade 612 rearward toward the anchor portion 650 of the blade 612, arc surface 780 provides clearance, and arc surfaces 776, 778 are displaced away from contact with the retention pin 622. This displacement permits the retaining portion 648 to be released from the retention pin 622, thus allowing for removal of the blade 612 from the holder 616. Preferably, "δ" is substantially 40.0°.

An imaginary line "L3" extends from point "P2" to point "P3." Like line "L2," line "L3" defines a width of the slot 676. The length of line "L3" is substantially equal to the diameter of the retention pin 622. The midpoint "M" is the midpoint of line "L3."

A substantially straight line "L4" extends vertically and, thus, substantially perpendicular to line "L2" from point "P1" a relatively short distance to a point "P5." The length of line "L4" is, preferably, approximately 0.004 inch. A substantially straight line "L5" extends diagonally outward from point "P5" to the bottom surface 654 of the blade 612. A substantially straight line "L6" extends vertically and, thus, substantially perpendicular to line "L2" from point P4 and to the bottom surface 654 of the blade 612 such that line "L5" is non-parallel with line "L6." The volume represented in two dimensions by the area bounded by lines "L2," "L4," "L5," and "L6" defines the opening 680.

To mount the blade 612 to the arbor 614, the retaining portion 648 is lowered into the opening 680. Then, the retaining portion 648 is lowered into the volume represented in two dimensions by the area bounded by lines "L2" and "L3" and arc surface 780 and then into the remainder of the slot 676 until the retention pin 676 engages arc surfaces 776, 778.

It will be appreciated by those having ordinary skill in the art that the slot 676 can have any suitable shape and size and structural relationship with respect to the retaining portion 648 such that the retention pin 622 and slot 676 cooperate to removably retain the blade 612 relative to the retention pin 622. It will also be appreciated that such cooperation allows the retention spring 682 and flex portion 646 to flex and the flex portion adjustably pivot about the retention pin 622 in a stressed condition of the blade 612 when the head portion 644 of the blade 612 moves inwardly relative to the arbor 614 during deburring operations.

The blade 612 includes a tab 790 for facilitating insertion and removal of the blade 612 relative to the arbor 614 without use of any tools. More specifically, the tab 790 co-extends integrally and substantially parallel with the top surface 652 of the retaining portion 648 proximate and toward the flex portion 646 of the blade 612.

In FIGS. 19 and 20, the adjustment screw 620 is shown adjusted downward such that the upper jaw 684 and retention spring 682 are compressed (but not necessarily completely compressed) to force the head portion 644 of the blade 612 outward relative to the arbor 614. By way of the limit portion 784 of the contact portion 782 of the upper jaw 684, clearance between the upper jaw 684 and portion of the retention spring 682 disposed distal the retention pin 622 is maintained. In FIG. 19 and as described in detail below in connection with operation of the deburring tool 610, the flex portion 646 of the blade 612 is shown in a flexed, or bent or stressed, state while the anchor portion 650 remains fixedly disposed within the holder 616.

Figure 23:
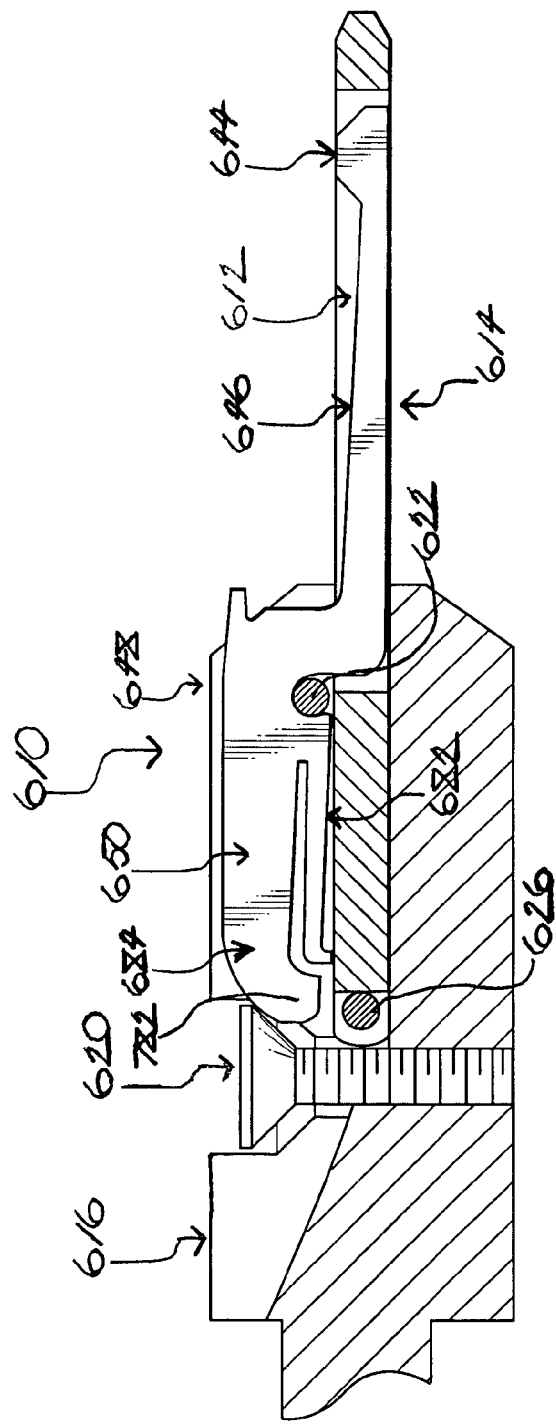
FIG. 23 is a sectional side view of the deburring tool of the present invention shown in FIG. 19 illustrating the head portion of the blade of the deburring tool totally recessed relative to the arbor in the unstressed condition of the blade.

In FIG. 23, the adjustment screw 620 is shown adjusted elevated such that the upper jaw 684 is elevated and retention spring 682 is relaxed/extended to lower the head portion 644 of the blade 612 relative to the arbor 614. In this way, the retention spring 682 does not operatively engage the upper jaw 684.

Figure 24:
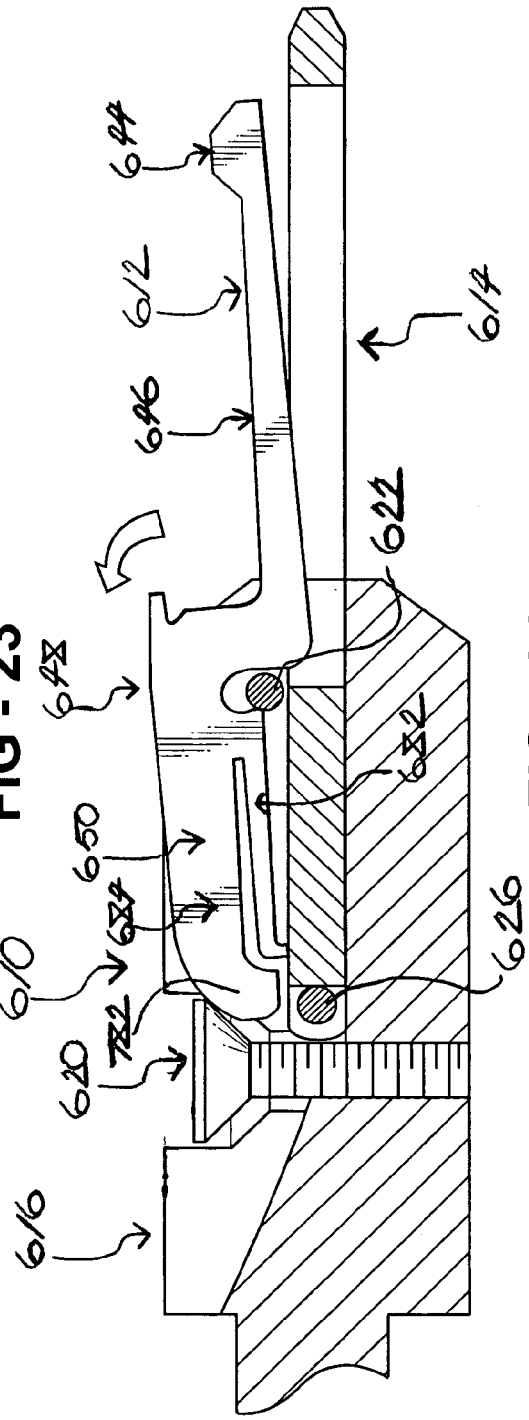
FIG. 24 is a sectional side view of the deburring tool of the present invention shown in FIG. 19 illustrating the path of motion of removal of the blade of the deburring tool.

In FIG. 24, the blade 612 is shown in position to be mounted into the arbor 614 and holder 616 and being moved rearward such that line "L5" can clear the retention pin 622. As a result, the retention spring 682 flexes to be completely compressed, allowing the contact portion 782 of the elevated upper jaw 684 to move rearward and downward in relation to the adjustment screw 620. In this way, the retention spring 682 is not operatively engaging the upper jaw 684. Once line "L5" completely clears the retention pin 622, the retention spring 682 again forces the contact portion 782 forward and upward, which fully engages arc surfaces 776, 778 with the retention pin 622. Removal of the blade 612 is simply a reversal of this process.

The blade 612 can be removed from the arbor 614 when the adjustment screw 620 and, thus, upper jaw 684 are completely elevated, the retention spring 682 is completely compressed, and the head portion 644 is completely recessed relative to the arbor 614. The blade 612 can also be removed from the arbor 614 when the adjustment screw 620 and, thus, upper jaw 684 are partially elevated, the retention spring 682 is partially compressed, and the head portion 644 is partially recessed or elevated relative to the arbor 614. However, the blade 612 cannot be removed from or inserted into the arbor 614 when the adjustment screw 620 is compressed beyond a certain distance since the blade 612 cannot be forced sufficiently rearward for line "L5" to clear the retention pin 622.

Referring now to FIGS. 25-26, where like numerals increased by 800 are used to represent structure like that of the deburring tool 10, a fifth embodiment of a deburring tool of the present invention, generally indicated at 810, is shown. Unlike the anchor portion 650 of the deburring tool 610, an anchor portion, generally indicated at 850, is disposed within the slot 838 of the arbor 814 and between the slot 838 and an adjustment member, generally indicated at 820. As such, the holder 816 does not include a slot to receive and hold the blade 812, and the retention pin 822 is mounted to the arbor 814, not to the holder 816.

Unlike the blade 612, the blade 812 is substantially straight such that the retaining portion 848 of the blade 812 does not form a stairway from the flex portion 846 to the anchor portion 850 of the blade 812. Also unlike the blade 612, the blade 812 does not include a tab for facilitating insertion and removal of the blade 812 relative to the arbor 814 without use of any tools. The arbor 814 must be removed to facilitate insertion or removal of the blade 812.

Referring now to FIG. 28, where like numerals increased by 1000 are used to represent structure like that of the deburring tool 10, a sixth embodiment of a deburring tool of the present invention, generally indicated at 1010, is shown. Unlike the holders 616, 816 of the deburring tools 610, 810, respectively, the holder 1016 is adapted to mount a non-adjustable retention member, generally indicated at 1020, supported within holder 1016. The retention member 1020 is adapted to operatively apply a force upon an anchor portion, generally indicated at 1050, of the blade 1012 toward the arbor 1014 and head portion 1044 of the blade 1012 to elevate the head portion 1044 the predetermined distance from the arbor 1014 in the unstressed condition of the blade 1012. Unlike the blades 612, 812 of the deburring tools 610, 810, respectively, the blade 1012 does not include a retention spring. As such, only the anchor portion 1050 is adapted to engage an exterior top surface of the tail portion 1034 of the arbor 1014. The attitude of the head portion 1044 of the blade 1012 of the deburring tool 1010 is preset and cannot be adjusted.

More specifically, the anchor portion 1050 includes a contact surface 1182 that is operatively engaged by the retention member 1020 and a limit surface 1184 the entire bottom surface of which is adapted to engage the exterior top surface of the tail portion 1034 of the arbor 1014. The anchor portion 1050 is disposed between the tail portion 1034 of the arbor 1014 and retention member 1020. The slot 1076 of the retaining portion 1048 is defined between the anchor portion 1050 and flex portion 1046 of the blade 1012. The retention pin 1022 and slot 1076 cooperate to allow only the flex portion 1046 to flex and adjustably pivot about the retention pin 1022 in a stressed condition of the blade 1012 when the head portion 1044 of the blade 1012 moves inwardly relative to the arbor 1014 during deburring operations. The stop pin 1026 is disposed between the retention member 1020 and arbor 1014 and adapted to limit the distance the arbor 1014 is received within and along the holder 1016. The stop pin 1026 is disposed in non-contacting relationship with the retention member 1020.

Referring now to FIGS. 29-30, where like numerals increased by 1200 are used to represent structure like that of the deburring tool 10, a seventh embodiment of a deburring tool of the present invention, generally indicated at 1210, is shown. Unlike the deburring tools 610, 810, 1010, the deburring tool 1210 does not include a holder. As such, unlike the arbors 614, 814, 1014, the arbor 1214 is not fastened in a holder. Rather, the arbor 1214 is fastened in the chuck of the drive motor, for instance, and, thus, can be adjusted, but the arbor 1214 cannot be changed absent removal of the arbor 1214 from the chuck. In this way, the arbor 1214 is essentially a disposable tool. The arbor 1214 is adapted to receive the retention pin 1222, a limiting pin 1392, and a resisting pin 1393 and, thus, further includes a retention-pin hole (not shown), a limiting-pin hole (not shown), and a resisting-pin hole (not shown). As shown in FIGS. 29 and 30, the end of the arbor 1214 disposed opposite the chip slot 1238 is adapted to be received by the chuck of the drive motor.

Like the blade 612 of the deburring tool 610, the blade 1212 has a retention spring, generally indicated at 1282. Like the blade 812, the blade 1212 is substantially straight such that the retaining portion 1248 of the blade 1212 does not form a stairway from the flex portion 1246 to an anchor portion, generally indicated at 1250, of the blade 1212. Also like the blade 812, the blade 1212 does not include a tab for facilitating insertion and removal of the blade 1212 relative to the arbor 1214 without use of any tools.

The arbor 1214 is adapted to mount an adjustment member, generally indicated at 1220, supported within the arbor 1214 and adapted to operatively engage the anchor portion 1250 of the blade 1212. The anchor portion 1250 is adapted to move in response to adjustment of the adjustment member 1220 in a direction substantially opposite that of the head portion 1244 of the blade 1244 and flex to control the attitude of the head portion 1244 relative to the arbor 1214 by elevating the head portion 1244 relative to the arbor 1214 for deburring operations or recessing the head portion 1244 relative to the arbor 1214.

The structure and function of the anchor portion 1250 is identical to that of the anchor portion 850 of the blade 812 of the deburring tool 810. However, the deburring tool 1210 includes the limiting pin 1392 adapted to engage the bottom surface of the upper jaw 1284 for limiting the movement of the anchor portion 1250 downward and disposed in non-contacting relationship with the adjustment member 1220. The deburring tool 1210 also includes the resisting pin 1393 adapted to engage the bottom surface of the retention spring 1282 and disposed in non-contacting relationship with the adjustment member 1220. Each of an upper jaw 1284 and retention spring 1222 includes a limit portion 1384 adapted to engage the corresponding pair of limiting pins 1392 for limiting the movement of the anchor portion 1250. The anchor portion 1250 is disposed within the slot 1238 of the arbor 1214 and between the slot 1238 and the adjustment member 1220.

The structure and function of the adjustment member 1220 is identical to those of the adjustment member 820 of the deburring tool 810. The structure and function of a tension member 1388 is identical to those of the tension member 788 of the deburring tool 610.

Operation of the deburring tool 10, 210, 410, 610, 810, 1010, 1210 will now be described with reference to operation of the deburring tool 10. In operation of the deburring tool 10, the head portion 44 of the blade 12 is supported in an operable position in which the head portion 44 projects from the slot 38 in an unstressed position of the blade 12 as shown in FIG. 1. However, the blade 12 is sufficiently resiliently yieldable such that the head portion 44 can move inwardly with respect to the slot 38 during a deburring operation.

To begin the deburring operation, the shank 154 of the holder 16 (or the shank 554, 1254 extending from the arbor 414, 1214) is rotatably mounted in the rotatable tool holder or chuck and rotated. As shown in FIG. 19, the head portion 32 of the arbor 14 is then advanced toward a hole 794 defined in a work piece, generally indicated at 792. The hole 794 defines a leading edge 796 and a trailing edge 798. The cutting leading surface 58 of the head portion 44 of the blade 12 engages the leading edge 796 of the hole 794 to apply a force upon the leading surface 58 of the blade 12 in a substantially rearward and downward direction to remove burrs from the leading edge 796 and form a slight chamfer on the leading edge 796. However, as shown in FIG. 4B (and FIG. 22), since arc surface 178 (arc surface 778) along arc "A2" prevents the blade 12 from moving rearward, all resulting movement of the blade 12 is downward due to flexing of the flex portion 46 of the blade 12.

The arbor 14 then advances into the hole 794. The non-cutting top surface 56 of the head portion 44 of the blade 12 resiliently engages a wall 799 defined by the hole 794 as the blade 12 moves through the hole 794. As the arbor 14 exits the hole 794, the trailing edge 798 of the hole 794 applies a force upon the cutting trailing surface 60 of the head portion 44 of the blade 12 in a substantially forward and downward direction. However, as shown in FIG. 4B (and FIG. 22), since arc surface 178 (arc surface 778) along arc "A3" prevents the blade 12 from moving forward, all resulting movement of the blade 12 is downward due to flexing of the flex portion 46 of the blade 12. When the head portion 44 of the blade 12 clears the trailing edge 798 of the hole 794, the direction of movement of the deburring tool 10 is reversed, and the cutting trailing surface 60 removes burrs from and slightly chamfers the trailing edge 798 of the hole 794.

As the blade 12 is withdrawn into the hole 794, the engagement of the cutting trailing surface 60 with the trailing edge 798 of the hole 794 causes the blade 12 to yield and permit the head portion 44 of the blade 12 to assume a stressed position. The amount of pressure applied by each of the cutting leading surface 58 and the cutting trailing surface 60 is determined by the resiliency of the blade 12 in the unstressed position of the head portion 44.

To mount the blade 12 to the arbor 14, the retention pin 22 is disposed into the slot 76 via the opening 80, as shown in FIG. 4. As the blade 12 is inserted into the channel 36 of the arbor 14, the retention pin 22 engages surface 181 of the retaining portion 48 while a force is exerted upon the blade 12 in a substantially downward direction. This engagement forces the blade 12 in a substantially rearward direction.

In turn and with respect to only the deburring tool 10, 210, 410, the upper jaw 84, 284, 484 is forced to open in relation to the lower jaw 82, 282, 482. Upon the blade 12, 212, 412 moving a sufficient distance in a substantially downward direction such that point "P1," as shown in FIG. 4B, is disposed below midpoint "M," the clip portion 50, 250, 450 springs the blade 12, 212, 412 in a substantially forward direction such that the retention pin 22, 222, 422 engages arc surfaces 176 and 178 along arc "A4."

To remove the blade 12 from the arbor 14, the blade 12 is retracted from the slot 76 via the opening 80, as shown in FIG. 4. The retention pin 22 engages surface 176 while force is exerted upon the blade 12 in a substantially upward direction. This engagement forces the blade 12 in a substantially rearward direction.

In turn and with respect to only the deburring tool 10, 210, 410, the upper jaw 84, 284, 484 is forced to open in relation to the lower jaw 82, 282, 482. Upon the blade 12, 212, 412 moving a sufficient distance in a substantially upward direction such that point "P1", as shown in FIG. 4B, is disposed above midpoint "M" of the retention pin 22, 222, 422, the clip portion 50, 250, 450 springs the blade 12, 212, 412 in a substantially forward direction. This is quickly and manually performed without use of any tools. In addition, this operation can be performed while the deburring tool 10, 210, 410 remains mounted in the rotatable tool holder or chuck.

The deburring tool 10, 210, 410, 610, 810, 1010, 1210 includes the blade 12, 112, 412, 612, 812, 1012, 1212. Each of the blade 12, 212, 412, 612, 812, 1012, 1212 and arbor 14, 214, 614, 814, 1014 can be independently replaced. Since the arbor 14, 214, 614, 814, 1014 is fastened in the holder 16, 216, 616, 816, 1016 with a clamp screw, a tool is required to replace the arbor 14, 214, 614, 814, 1014. On the other hand, since the arbor 414, 1214 is not fastened in a holder, the arbor 414, 1214 is essentially a disposable deburring tool 410, 1210.

Each of the blade 12, 212, 412, 612, 812, 1012, 1212 and arbor 14, 214, 414, 614, 814, 1014, 1214 can be easily changed or adjusted independently of one another, and, thus, the deburring tool 10, 210, 410, 610, 810, 1010, 1210 provides faster, more convenient, and cost-effective changes and adjustments of the blade 12, 212, 412, 612, 812, 1012, 1212 and arbor 14, 214, 414, 614, 814, 1014, 1214 than do the deburring tools of the related art. The blade 12, 212, 412, 612, 812, 1012, 1212 can be changed or adjusted without removing the arbor 14, 214, 414, 614, 814, 1014, 1214. The blade 12, 212, 412, 612, 812, 1012, 1212 can be retained relative to the arbor 14, 214, 414, 614, 814, 1014, 1214 and flex and adjustably pivot in a stressed condition of the blade 12, 212, 412, 612, 812, 1012, 1212 during deburring operations. Each of the blade 12, 212, 412, 612, 812, 1012, 1212 and arbor 14, 214, 414, 614, 814, 1014, 1214 has a simple, efficient design to allow for low-cost manufacturing of the blade 12, 212, 412, 612, 812, 1012, 1212 and arbor 14, 214, 414, 614, 814, 1014, 1214 from durable and very hard M-2 high-speed tool steel.

The holder 16, 216, 616, 816, 1016 can be left in the chuck while the blade 12, 212, 612, 812, 1012 and/or arbor 14, 214, 614, 814, 1014 are/is changed or adjusted, thereby eliminating a need to reset positions/movements of the chuck and/or drive motor and reducing downtime in any deburring operation to increase the efficiency thereof. The deburring tool 10, 210, 410, 610, 810, 1010, 1210 can be an adjustable-position deburring tool 10, 610, 810, 1210 or a fixed-position deburring tool 210, 410, 1010. Each of the blade 12, 212, 612, 812, 1012 and arbor 14, 214, 614, 814, 1014 is interchangeable between a holder 16, 616, 816 of the arbor 14, 614, 814 of an adjustable-position deburring tool 10, 610, 810 and a holder 216, 1016 of the arbor 214, 1014 of a fixed-position deburring tool 210, 1010 of the same size. The mounting parts, such as the retention pin 22, 222, 422, 622, 822, 1022, 1222, last much longer than the mounting parts of the deburring tools of the related art. Most of the mechanics of the deburring tool 10, 210, 610, 810, 1010 are contained within the holder 16, 216, 616, 816, 1016. No holes are required to be formed in the arbor 10, 210, 610, 810, 1010.

The retention spring 682, 882, 1282 helps to maintain position of the remainder of the blade 612, 812, 1212. The arbor 614, 814, 1214 can prevent excessive movement of the anchor portion 650, 850, 1250 of the blade 614, 814, 1214 in one direction and, thus, elevation of the head portion 644, 844, 1244 of the blade 612, 812, 1212 relative to the arbor 614, 814, 1214 to prevent breakage of the head portion 644, 844, 1244 during deburring operations. The adjustment member 620, 820, 1020, 1220 operatively applies a force upon the anchor portion 650, 850, 1050, 1250 of the blade 612, 812, 1012, 1212 in only one direction. The deburring tool 610, 810, 1010, 1210 can prevent the adjustment member 620, 820, 1020, 1220 from self-adjusting during deburring operations. Finally, the deburring tool 610, 810, 1010, 1210 is relatively attractive and simple and inexpensive to use.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A deburring tool adapted to be rotatably mounted in a chuck of a drive motor for performing deburring operations, said deburring tool comprising:

a blade having a cutting head portion defined at one end of said blade, an anchor portion defined at the other end of said blade, and a retention spring;

an arbor adapted to receive and removably mount said blade such that said head portion of said blade is adapted to be elevated a predetermined distance from said arbor in an unstressed condition of said blade, said blade being sufficiently resiliently yieldable such that said head portion thereof can move inwardly relative to said arbor during deburring operations; and a holder adapted to mount said arbor and an adjustment member supported within said holder and adapted to operatively engage said anchor portion of said blade;

said anchor portion of said blade adapted to move in response to adjustment of said adjustment member in a direction substantially opposite that of said head portion and flex to control the attitude of said head portion relative to said arbor by elevating said head portion relative to said arbor for deburring operations or recessing said head portion relative to said arbor.

2. A deburring tool as set forth in claim 1, wherein said anchor portion of said blade includes an upper jaw and a lower jaw disposed in spaced relation to said upper jaw and defining said retention spring, said retention spring adapted to flex with respect to said upper jaw to provide flexibility of said anchor portion to retain said blade mounted relative to said arbor and to control the attitude of said head portion relative to said arbor in response to adjustment of said adjustment member.

3. A deburring tool as set forth in claim 2, wherein said upper jaw includes a contact portion that is operatively engaged by said adjustment member for moving said anchor portion, each of said upper jaw and retention spring including a limit portion adapted to engage a surface of said arbor for limiting the movement of said anchor portion.

4. A deburring tool as set forth in claim 3, wherein said arbor includes a head portion, a tail portion, and a slot defined therebetween, said anchor portion of said blade disposed between said tail portion and said adjustment member.

5. A deburring tool as set forth in claim 3, wherein said arbor includes a distal end, a terminal portion, and a slot defined therebetween, said anchor portion of said blade disposed within said slot and between said slot and said adjustment member.

6. A deburring tool as set forth in claim 1, wherein said adjustment member includes a longitudinal axis extending substantially parallel to the path of motion of said blade, the position of said adjustment member adapted to be adjusted along the longitudinal axis thereof.

7. A deburring tool as set forth in claim 6, wherein said adjustment member is an adjustment screw having a head, said head adapted to operatively engage said contact portion of said anchor portion of said blade for moving said anchor portion in response to adjustment of the position of said adjustment screw along the longitudinal axis thereof.

8. A deburring tool as set forth in claim 1, wherein said blade includes a flex portion and a retaining portion defined between said head and anchor portions of said blade, said deburring tool includes a retention pin, and said retaining portion includes a slot defined between said retention spring and flex portion and adapted to receive said retention pin, said retention pin and slot cooperating to retain said blade relative to said retention pin and allow said retention spring and flex portion to flex and said flex portion to adjustably pivot about said retention pin in a stressed condition of said blade when said head portion moves inwardly relative to said arbor during deburring operations.

9. A deburring tool as set forth in claim 1, wherein said deburring tool includes a tension member extending substantially transversely to the longitudinal axis of each of said blade and adjustment member and adapted to provide transverse passive resistance to said adjustment member to prevent self-adjustment of said adjustment member during deburring operations.

10. A deburring tool as set forth in claim 1, wherein said deburring tool includes a stop pin disposed between said adjustment member and arbor and adapted to limit the distance said arbor is received within and along said holder, said stop pin being disposed in non-contacting relationship with said adjustment member.

11. A deburring tool as set forth in claim 1, wherein said blade includes a tab for facilitating insertion and removal of said blade relative to said arbor without use of any tools.

12. A deburring tool adapted to be rotatably mounted in a chuck of a drive motor for performing deburring operations, said deburring tool comprising:
   a blade having a cutting head portion defined at one end of said blade and an anchor portion defined at the other end of said blade and including a retention spring; and
   an arbor adapted to receive and removably mount said blade such that said head portion of said blade is adapted to be elevated a predetermined distance from said arbor in an unstressed condition of said blade, said blade being sufficiently resiliently yieldable such that said head portion can move inwardly relative to said arbor during deburring operations, said arbor also adapted to mount an adjustment member supported within said arbor and adapted to operatively engage said anchor portion of said blade;
   said anchor portion of said blade adapted to move in response to adjustment of said adjustment member in a direction substantially opposite that of said head portion and flex to control the attitude of said head portion relative to said arbor by elevating said head portion relative to said arbor for deburring operations or recessing said head portion relative to said arbor.

13. A deburring tool as set forth in claim 12, wherein said anchor portion of said blade includes an upper jaw and a lower jaw disposed in spaced relation to said upper jaw and defining said retention spring, said retention spring adapted to flex with respect to said upper jaw to provide flexibility of said anchor portion to retain said blade mounted relative to said arbor and to control the attitude of said head portion relative to said arbor in response to adjustment of said adjustment member.

14. A deburring tool as set forth in claim 13, wherein said deburring tool includes a pair of limiting pins disposed in non-contacting relationship with said adjustment member, said upper jaw including a contact portion that is operatively engaged by said adjustment member for moving said anchor portion and each of said upper jaw and retention spring including a limit portion adapted to engage corresponding said pair of limiting pins for limiting the movement of said anchor portion.

15. A deburring tool as set forth in claim 12, wherein said arbor includes a head portion, a tail portion, and a slot defined therebetween, said anchor portion of said blade disposed within said slot and between said slot and said adjustment member.

16. A deburring tool as set forth in claim 12, wherein said adjustment member includes a longitudinal axis extending substantially parallel to the path of motion of said blade, the position of said adjustment member adapted to be adjusted along the longitudinal axis thereof.

17. A deburring tool as set forth in claim 16, wherein said adjustment member is an adjustment screw having a head, said head adapted to operatively engage said contact portion of said anchor portion of said blade for moving said anchor portion in response to adjustment of the position of said adjustment screw along the longitudinal axis thereof.

18. A deburring tool as set forth in claim 12, wherein said blade includes a flex portion and a retaining portion defined between said head and anchor portions of said blade, said deburring tool includes a retention pin, and said retaining portion includes a slot defined between said retention spring and flex portion and adapted to receive said retention pin, said retention pin and slot cooperating to retain said blade relative to said retention pin and allow said retention spring and flex portion to flex and said flex portion to adjustably pivot about said retention pin in a stressed condition of said blade when said head portion moves inwardly relative to said arbor during deburring operations.

19. A deburring tool as set forth in claim 12, wherein said deburring tool includes a tension member extending substantially transversely to the longitudinal axis of each of said blade and adjustment member and adapted to provide transverse passive resistance to said adjustment member to prevent self-adjustment of said adjustment member during deburring operations.

20. A deburring tool adapted to be rotatably mounted in a chuck of a drive motor for performing deburring operations, said deburring tool comprising:
   a blade having a cutting head portion defined at one end of said blade and an anchor portion defined at the other end of said blade;
   an arbor adapted to receive and removably mount said blade such that said head portion of said blade is adapted to be elevated a predetermined distance from said arbor in an unstressed condition of said blade, said blade being sufficiently resiliently yieldable such that said head portion can move inwardly relative to said arbor during deburring operations; and
   a holder adapted to mount said arbor and a non-adjustable retention member supported within said holder and adapted to operatively apply a force upon said anchor portion of said blade toward said arbor and head portion to elevate said head portion the predetermined distance from said arbor in the unstressed condition of said blade.

21. A deburring tool as set forth in claim 20, wherein said anchor portion includes a contact portion that is operatively engaged by said retention member and a limit portion adapted to engage a surface of said arbor.

22. A deburring tool as set forth in claim 21, wherein said arbor includes a head portion, a tail portion, and a slot defined therebetween, said anchor portion of said blade disposed between said tail portion and said retention member.

23. A deburring tool as set forth in claim 20, wherein said blade includes a retaining portion and a flex portion defined between said head and anchor portions of said blade, said deburring tool includes a retention pin, and said retaining portion includes a slot defined between said anchor portion and flex portion and adapted to receive said retention pin, said retention pin and slot cooperating to retain said blade relative to said retention pin and allow said flex portion to flex and adjustably pivot about said retention pin in a stressed condition of said blade when said head portion moves inwardly relative to said arbor during deburring operations.

24. A deburring tool as set forth in claim 20, wherein said deburring tool includes a stop pin disposed between said retention member and arbor and adapted to limit the distance said arbor is received within and along said holder, said stop pin being disposed in non-contacting relationship with said retention member.

25. A deburring tool as set forth in claim 20, wherein said blade includes a tab for facilitating insertion and removal of said blade relative to said arbor without use of any tools.

* * * * *